(12) United States Patent
Yang et al.

(10) Patent No.: US 11,172,604 B2
(45) Date of Patent: Nov. 16, 2021

(54) RIDING LAWN MOWER LAP BAR POSITION DETECTION

(71) Applicant: Nanjing Chervon Industry Co., Ltd., Nanjing (CN)

(72) Inventors: Dezhong Yang, Nanjing (CN); Jicun Cai, Nanjing (CN); Xiubo Dai, Nanjing (CN); Zhen Wang, Nanjing (CN); Toshinari Yamaoka, Nanjing (CN); Dingming Meng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/003,649

(22) Filed: Aug. 26, 2020

(65) Prior Publication Data

US 2020/0390031 A1 Dec. 17, 2020

Related U.S. Application Data

(63) Continuation of application No. PCT/CN2019/080111, filed on Mar. 28, 2019.

(30) Foreign Application Priority Data

Mar. 28, 2018 (CN) .......................... 201810264722.6
Feb. 1, 2019 (CN) .......................... 201910104580.1

(51) Int. Cl.
*A01D 34/00* (2006.01)
*A01D 34/64* (2006.01)
(Continued)

(52) U.S. Cl.
CPC .......... *A01D 34/006* (2013.01); *A01D 34/64* (2013.01); *A01D 34/69* (2013.01); *A01D 69/02* (2013.01);
(Continued)

(58) Field of Classification Search
CPC .......... G05G 1/015; G05G 1/04; G05G 9/047; G05G 2009/04755; G01D 5/16;
(Continued)

(56) References Cited

U.S. PATENT DOCUMENTS 3,331,971 A * 7/1967 Moller ..................... G01L 5/223
310/10
3,331,972 A * 7/1967 Moller ..................... G01D 5/145
310/10
(Continued)

FOREIGN PATENT DOCUMENTS

| CN | 103813918 A | 5/2014 |
|----|-------------|--------|
| CN | 103959989 A | 8/2014 |

(Continued)

OTHER PUBLICATIONS

ISA/CN, Int. Search Report issued on PCT application No. CN2019/080111, dated Jun. 6, 2019, 2 pages.
(Continued)

*Primary Examiner* — Arpad Fabian-Kovacs
(74) *Attorney, Agent, or Firm* — Greenberg Traurig, LLP

(57) ABSTRACT

A riding lawn mower includes a chassis, a power output assembly, a walking assembly, a power supply device, a control module, and an operating apparatus. The operating apparatus includes at least one bracket, an operating lap bar assembly, a pivoting assembly, and a position detecting module. The pivoting assembly mounts the operating lap bar of the operating lap bar assembly on the bracket. The operating lap bar can rotate around different positions in a first direction F1 and/or a second direction F2. The position detecting module includes a magnetic element and a magnetic sensor. The magnetic element is provided on the pivoting assembly or the bracket and the magnet sensor is spaced from the magnetic element so that the magnetic element and the magnetic sensor can generate a relative (Continued)

movement for detecting the position of the operating lap bar in the first direction F1 and/or the second direction F2.

42 Claims, 28 Drawing Sheets

(51) Int. Cl.
| | |
|---|---|
| *A01D 34/69* | (2006.01) |
| *A01D 69/02* | (2006.01) |
| *G01D 5/14* | (2006.01) |
| *G01D 5/16* | (2006.01) |
| *G05G 1/015* | (2008.04) |
| *G05G 1/04* | (2006.01) |
| *G05G 9/047* | (2006.01) |
| *A01D 101/00* | (2006.01) |
| *G01D 5/12* | (2006.01) |

(52) U.S. Cl.
CPC ............... *G01D 5/145* (2013.01); *G01D 5/16* (2013.01); *G05G 1/015* (2013.01); *G05G 1/04* (2013.01); *G05G 9/047* (2013.01); *A01D 2101/00* (2013.01); *G01D 5/12* (2013.01); *G01D 5/142* (2013.01); *G05G 2009/04755* (2013.01)

(58) Field of Classification Search
CPC .......... G01D 5/145; G01D 5/12; G01D 5/142; A01D 34/006; A01D 34/69; A01D 69/02; A01D 34/64; A01D 2101/00
See application file for complete search history.

(56) References Cited

U.S. PATENT DOCUMENTS

| | | | | |
|---|---|---|---|---|
| 4,500,867 A * | 2/1985 | Ishitobi | .................. | G01D 5/145 200/6 A |
| 5,589,854 A * | 12/1996 | Tsai | ......................... | A63F 13/06 345/161 |
| 5,969,520 A * | 10/1999 | Schottler | ................ | G01D 5/145 200/6 A |
| 6,104,382 A * | 8/2000 | Martin | ..................... | A63F 13/02 345/161 |
| 6,664,666 B2 * | 12/2003 | Corcoran | ................ | G05G 9/047 310/12.23 |
| 8,240,420 B1 | 8/2012 | Bartel et al. | | |
| 8,446,365 B2 * | 5/2013 | Weppenaar | ........... | G06F 3/0338 345/161 |
| 8,482,523 B2 * | 7/2013 | Didier | ....................... | G05G 1/02 345/161 |
| 8,794,660 B1 | 8/2014 | Stover et al. | | |
| 8,829,894 B2 * | 9/2014 | Banerjee | .................. | C22C 1/02 324/207.2 |
| 9,491,903 B2 * | 11/2016 | Dwyer | ................. | A01D 34/824 |
| 9,725,114 B1 * | 8/2017 | Brown | ................... | B62D 11/04 |
| 9,870,021 B2 * | 1/2018 | Olsson | ..................... | G05G 5/05 |
| 9,980,434 B1 * | 5/2018 | Brown | ................... | A01D 69/025 |
| 10,058,031 B1 * | 8/2018 | Brown | ................... | B60K 17/356 |
| 10,414,436 B1 * | 9/2019 | Bonny | ................. | B60K 7/0007 |
| 10,795,398 B2 * | 10/2020 | Sirohiwala | ............ | G05G 9/047 |
| 2010/0090689 A1 * | 4/2010 | Furuki | ................... | G01D 5/145 324/207.24 |
| 2012/0025809 A1 * | 2/2012 | Banerjee | .................. | G01D 5/12 324/207.2 |
| 2012/0242331 A1 * | 9/2012 | Dengler | ................. | G01D 5/145 324/207.25 |
| 2012/0262162 A1 * | 10/2012 | Masson | .................. | G01D 5/145 324/207.25 |
| 2014/0262630 A1 * | 9/2014 | Borshov | ................. | B60T 1/005 188/16 |
| 2015/0292499 A1 * | 10/2015 | Heathcoat, Jr. | ......... | F04B 49/12 417/53 |
| 2015/0308569 A1 * | 10/2015 | Heathcoat, Jr. | ....... | F16H 61/431 701/41 |
| 2016/0183451 A1 * | 6/2016 | Conrad | .................. | A01D 34/66 56/10.2 R |
| 2016/0290495 A1 * | 10/2016 | Bak | ........................ | G01D 5/142 |
| 2016/0302356 A1 | 10/2016 | Haun | | |
| 2017/0120922 A1 * | 5/2017 | Schaedler | .............. | A01D 34/64 |
| 2017/0152638 A1 * | 6/2017 | Fu | ............................ | E01H 5/098 |
| 2017/0247021 A1 * | 8/2017 | Krystowski | ............ | A01D 69/10 |
| 2018/0217626 A1 * | 8/2018 | Bartel | .................... | G05G 1/015 |
| 2018/0356854 A1 * | 12/2018 | Spiteri | ................... | G05G 9/047 |
| 2019/0195339 A1 * | 6/2019 | Kim | ........................ | F16H 59/044 |
| 2019/0274251 A1 * | 9/2019 | Dunbar | .................. | A01D 69/10 |
| 2019/0299795 A1 * | 10/2019 | Yan | ....................... | A01D 34/824 |
| 2020/0032480 A1 * | 1/2020 | Kukuk | .................... | E02F 9/225 |
| 2020/0120871 A1 * | 4/2020 | Woodrum | ............ | A01D 34/006 |
| 2020/0344947 A1 * | 11/2020 | Yan | ....................... | A01D 34/824 |

FOREIGN PATENT DOCUMENTS

| | | |
|---|---|---|
| CN | 104010918 A | 8/2014 |
| DE | 102006030319 A1 | 1/2008 |
| DE | 102009010244 A1 | 8/2010 |
| FR | 3050955 A1 | 11/2017 |
| WO | 2013062568 A1 | 5/2013 |

OTHER PUBLICATIONS

EPO, extended European search report issued of European patent application No. 19778301.2, dated Apr. 7, 2021, 8 pages.

\* cited by examiner

RIDING LAWN MOWER LAP BAR POSITION DETECTION

RELATED APPLICATION INFORMATION

The present application is a continuation of International Application Number PCT/CN2019/080111, filed on Mar. 28, 2019, the disclosure of which is incorporated herein by reference in its entirety. Further, through PCT/CN2019/080111, this application claims the benefit of Chinese Patent Application No. 201810264722.6, filed on Mar. 28, 2018 and Chinese Patent application number 201910104580.1, filed on Feb. 1, 2019 in the SIPO (State Intellectual Property Office—Chinese Patent Office), the disclosures of which are incorporated herein in their entirety by reference.

TECHNICAL FIELD

The present disclosure relates generally to a lawn mower, and more particularly to a riding lawn mower and its operating apparatus.

BACKGROUND

As a garden tool, lawn mowers are widely used in the field of trimming lawn and vegetation, etc. Existing lawn mowers generally include handheld lawn mowers and riding lawn mowers.

A riding lawn mower usually includes an operating apparatus. The operating apparatus includes an operating lap bar. The operating lap bar is arranged to be rotatable in the first direction and the second direction. The position of the operating lap bar in each direction corresponds to the different states of the driving motor and the different working states of the riding lawn mower. For example, a user can set a target rotation speed of the driving motor of the riding lawn mower by operating the operating lap bar in the first direction, and then control the walking speed of the riding lawn mower. The user can also operate the operating lap bar in the second direction, and then control the riding lawn mower to enter a working state or exit the working state (non-working state).

In order to know the position of the operating lap bar accurately, the riding mower further includes a position detecting module. The position detecting module is used to detect the position of the operating lap bar in various directions. For two positions in one direction, that is, two positions corresponding to the working state and the non-working state (usually the inboard position and the outboard position) of the riding lawn mower, the prior art generally employs a trigger switch to detect the position of the operating lap bar in the direction, which requires a reasonable arrangement of the trigger switch or a well-designed operating lap bar. This enables the trigger switch to be touched by the operating lap bar at a predetermined position, which causes the structure of the operating apparatus to be complicated, and the trigger switch will be invalid after frequent actions, so that the results of the detection are unreliable.

The statements in this section merely provide background information related to the present disclosure and may not constitute prior art.

SUMMARY

In order to solve the shortcomings of the prior art, the purpose of the present disclosure is to provide a riding lawn mower and an operating apparatus thereof with simple structure, reduced cost and reliable detection results.

In order to achieve the above objectives, the present disclosure adopts the following technical solutions:

In one aspect of the disclosure, a riding lawn mower includes: a chassis; a power output assembly comprising a blade for mowing function and a first motor for driving the blade; a walking assembly comprising walking wheels and a second motor for driving the walking wheel; a power supply device for supplying power to the riding lawn mower; a control module for controlling an operating process of the riding lawn mower; the second motor being controllable by the control module; an operating apparatus operable to set a target state of the riding lawn mower; the operating apparatus comprising: at least one bracket capable of being mounted on the chassis; an operating lap bar assembly comprising an operating lap bar disposed to rotate between a forward position, an intermediate position and a rear position about a first axis in a first direction and an inboard position and an outboard position about a second axis in a second direction; a pivoting assembly for pivotally mounting the operating lap bar on the bracket such that the operating lap bar rotates about the first axis in the first direction and the second axis in the second direction; a position detecting module electrically connected to the control module for detecting a position of the operating lap bar; and the position detecting module comprising a magnetic element and a magnet sensor, the magnet element being spaced apart from the magnet sensor such that the magnet sensor and the magnet element are capable of generating a relative movement and the magnet sensor can output a first detection signal related to the position of the operating lap bar in the first direction to the control module when the operating lap bar is rotated about the first axis in the first direction; and the magnet sensor and the magnet element are capable of generating a relative movement and the magnet sensor can output a second detection signal related to the position of the operating lap bar in the second direction to the control module when the operating lap bar is rotated about the second axis in the second direction; wherein the control module is capable of controlling the target state of the riding lawn mower according to the first detection signal and the second detection signal.

In another aspect of the disclosure, an operating apparatus for a riding lawn mower includes: at least one bracket capable of being mounted on the riding lawn mower; an operating lap bar assembly comprising an operating lap bar disposed to rotate between a forward position, an intermediate position and a rear position about a first axis in a first direction and an inboard position and an outboard position about a second axis in a second direction; a pivoting assembly for pivotally mounting the operating lap bar on the bracket such that the operating lap bar rotates about the first axis in the first direction and the second axis in the second direction; wherein the operating apparatus further includes a position detecting module for detecting a position of the operating lap bar; the position detecting module comprising a magnetic element and a magnet sensor, the magnet element being spaced apart from the magnet sensor such that the magnet sensor and the magnet element are capable of generating a relative movement and the magnet sensor can output a first detection signal related to the position of the operating lap bar in the first direction to the control module when the operating lap bar is rotated about the first axis in the first direction; and the magnet sensor and the magnet element are capable of generating a relative movement and the magnet sensor can output a second detection signal related to the position of the operating lap bar in the second direction to the control module when the operating lap bar is rotated about the second axis in the second direction.

In another aspect of the disclosure, an operating apparatus for a riding lawn mower includes: at least one bracket capable of being mounted on the riding lawn mower; an operating lap bar assembly comprising an operating lap bar disposed to rotate between a forward position, an intermediate position and a rear position; wherein the operating apparatus further includes a position detecting module; the position detecting module comprising a magnetic element and a magnet sensor, the magnet element being spaced apart from the magnet sensor such that the magnet sensor and the magnet element are capable of generating a relative movement when the operating lap bar rotates between the inboard position and the outboard position; and the magnetic sensor outputs a detection signal related to the position of the operating lap bar when the operating lap bar is rotated between the inboard position and the outboard position.

In another aspect of the disclosure, an operating apparatus for a riding lawn mower includes: at least one bracket capable of being mounted on the riding lawn mower; an operating lap bar assembly comprising an operating lap bar disposed to rotate between a forward position, an intermediate position and a rear position; a pivoting assembly for pivotally mounting the operating lap bar on the bracket such that the operating lap bar rotates between the forward position, the intermediate position and the rear position; wherein the operating apparatus further includes a position detecting module for detecting a position of the operating lap bar; the position detecting module comprising a magnetic element and a magnet sensor, the magnet element being spaced apart from the magnet sensor such that the magnet sensor and the magnet element are capable of generating a relative movement when the operating lap bar rotates between the forward position, the intermediate position and the rear position; and the magnetic sensor outputs a detection signal related to the position of the operating lap bar when the operating lap bar is rotated between the forward position, the intermediate position and the rear position.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustrative purposes only are not intended to limit the scope of the present disclosure. Corresponding reference numerals indicate corresponding parts throughout the several views of the drawings.

DETAILED DESCRIPTION

The present disclosure will be described in detail with reference to the drawings and specific examples.

Figure 1:
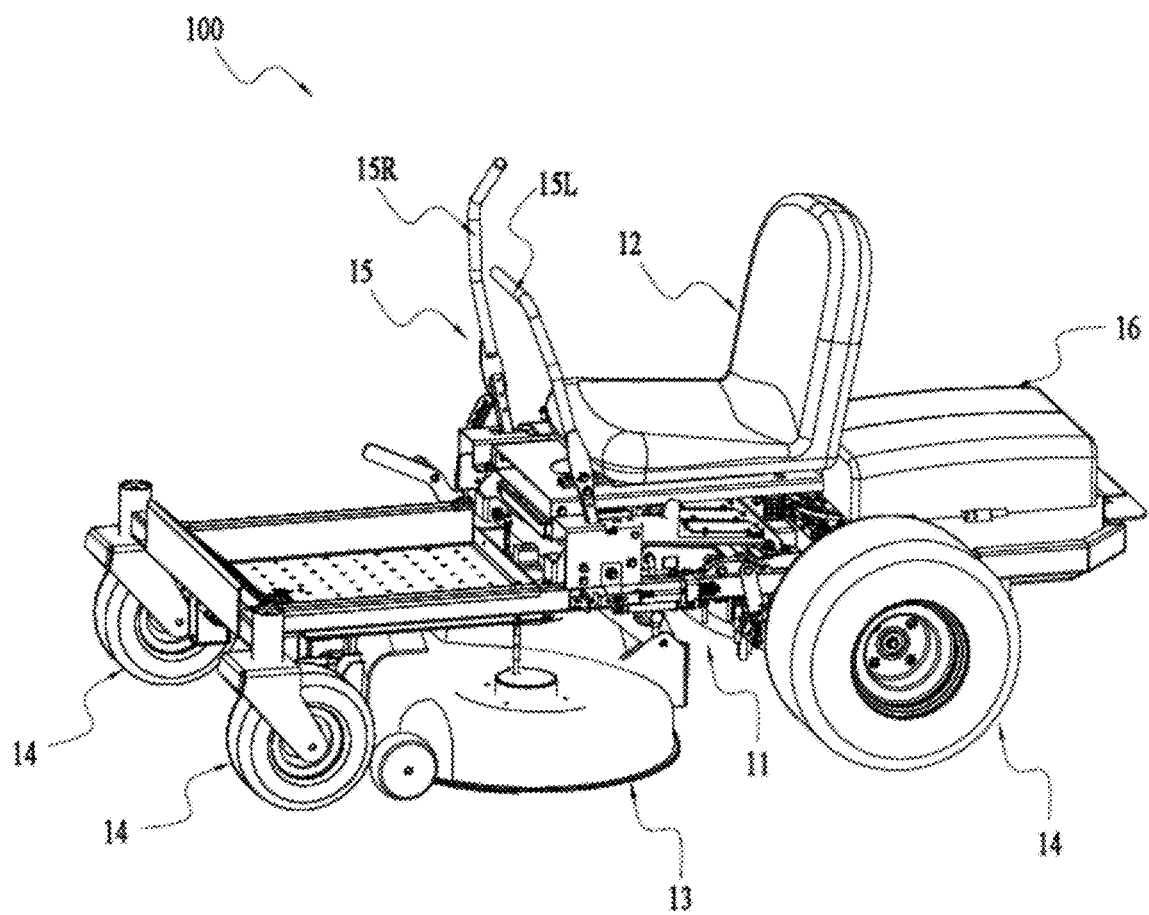
FIGS. 1 to 3 are perspective views of a riding lawn mower from different perspectives as one of the examples.
Figure 2:
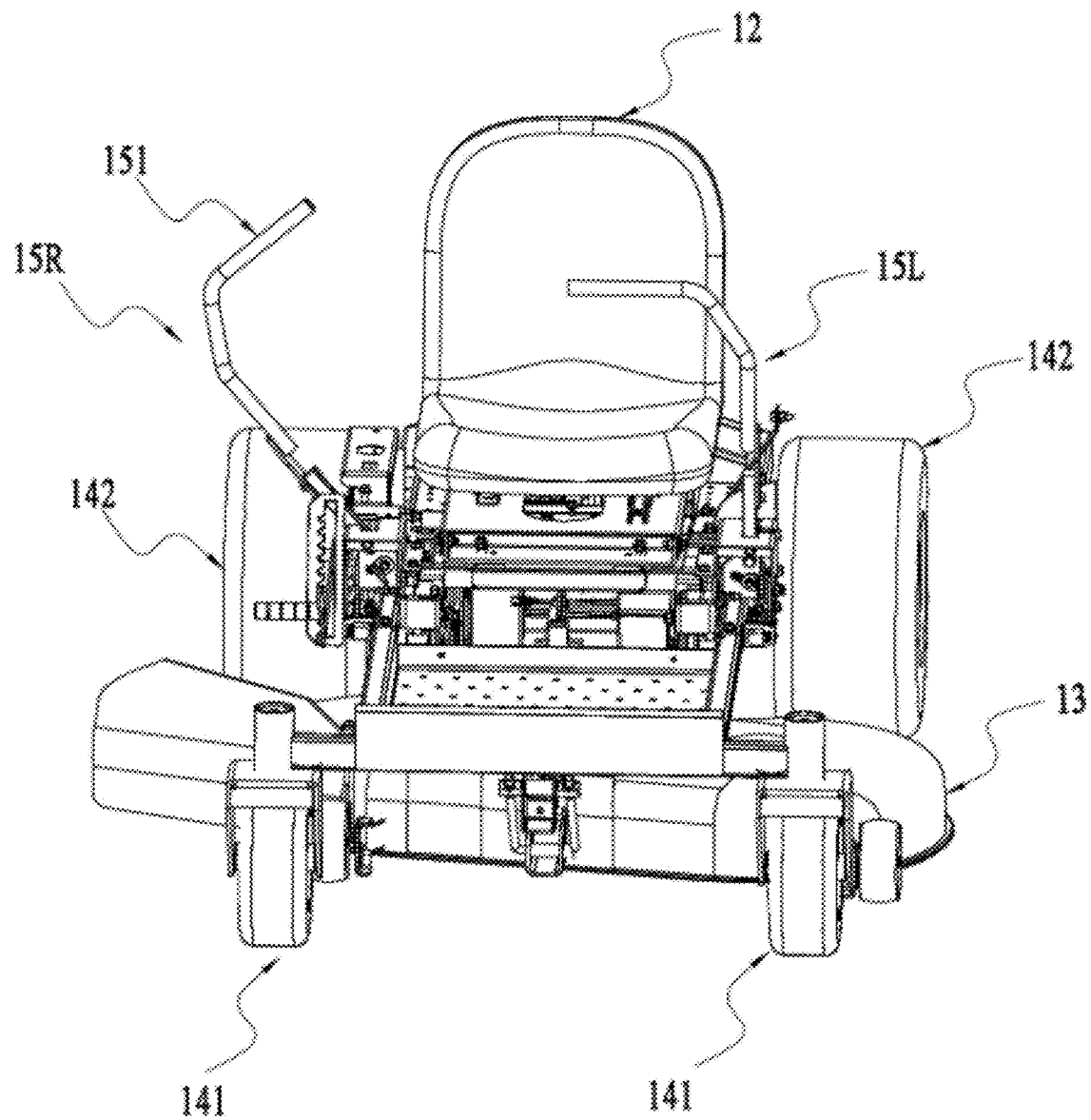
Figure 3:
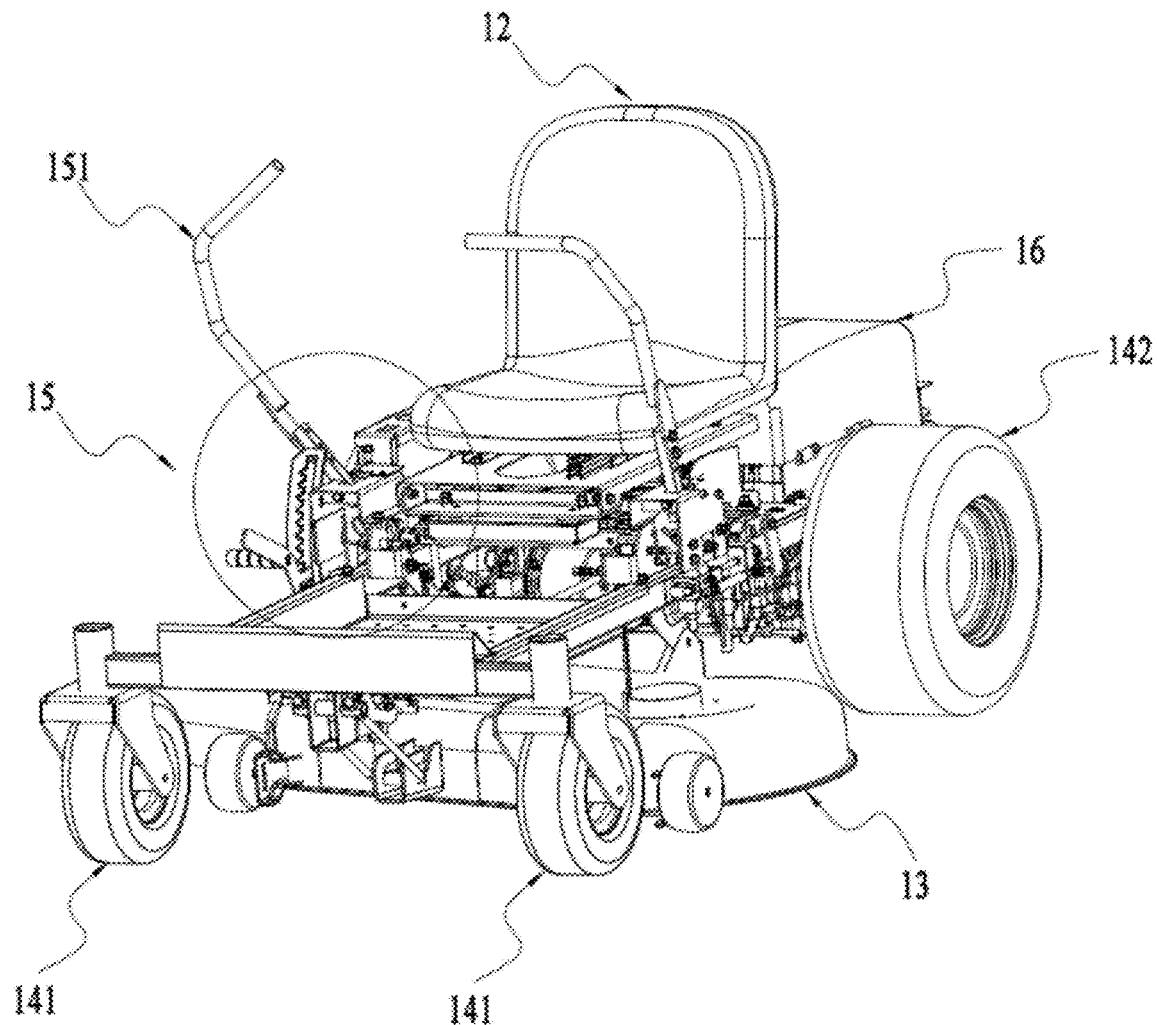
Figure 4:
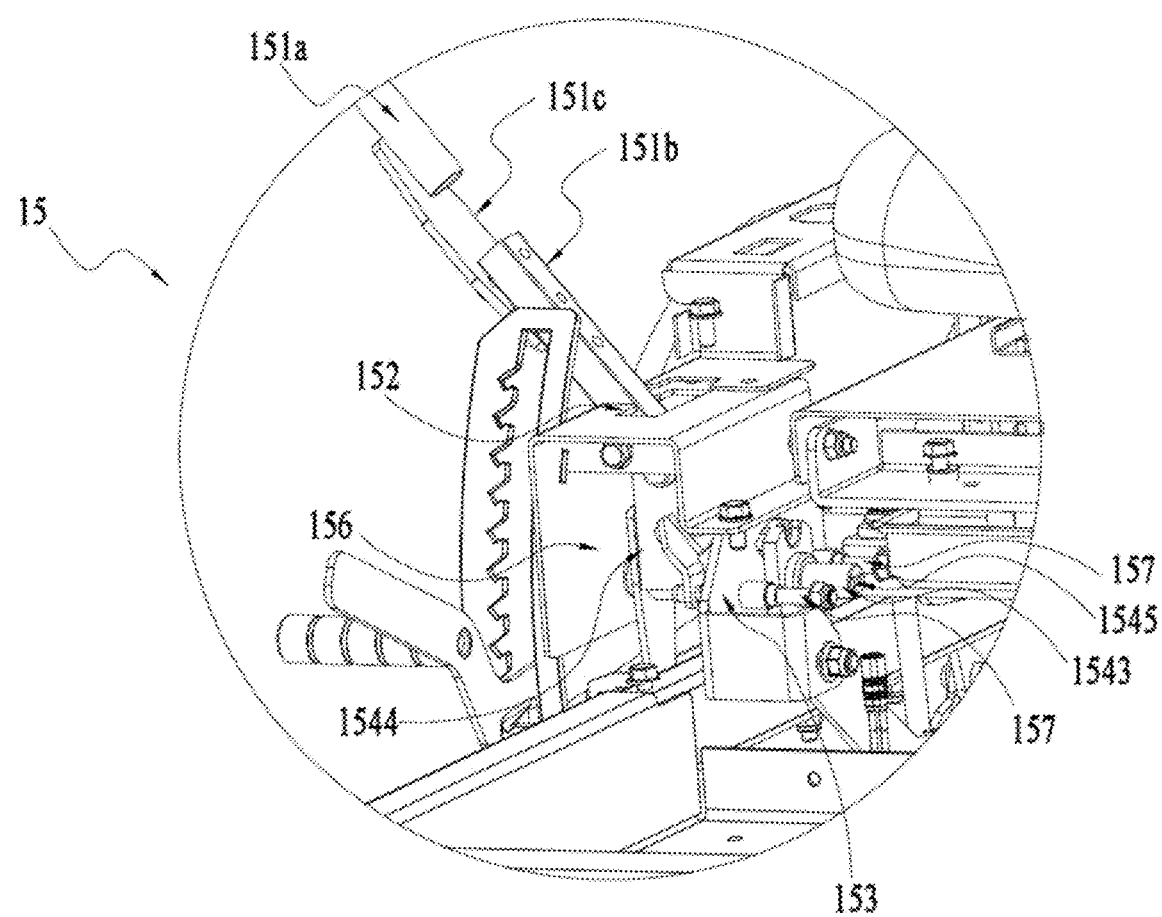
FIG. 4 is a partial enlarged view of the operating apparatus of the riding lawn mower shown in FIG. 3.
Figure 5:
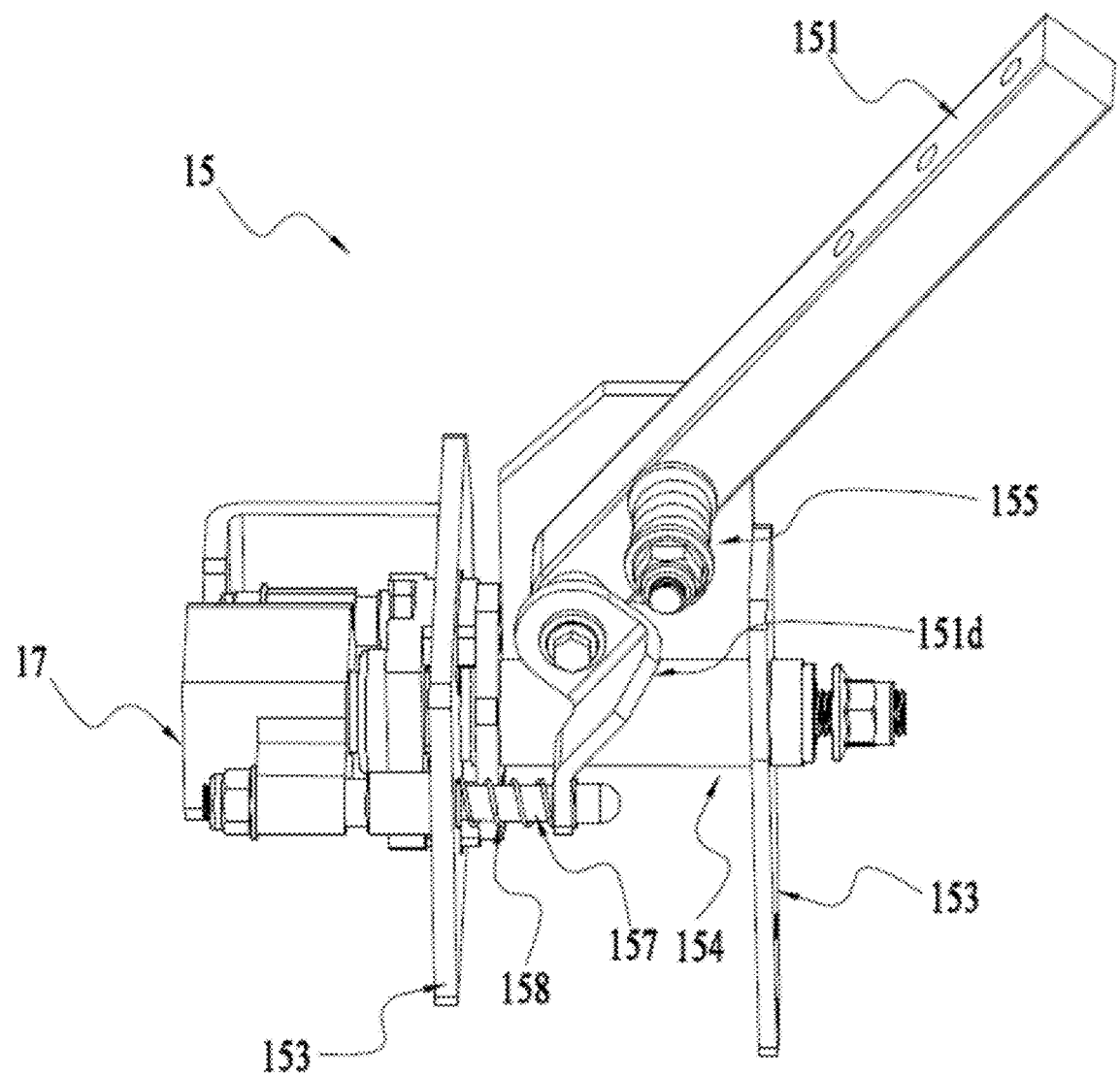
FIG. 5 is a perspective view of the operating apparatus as one of the examples.
Figure 6:
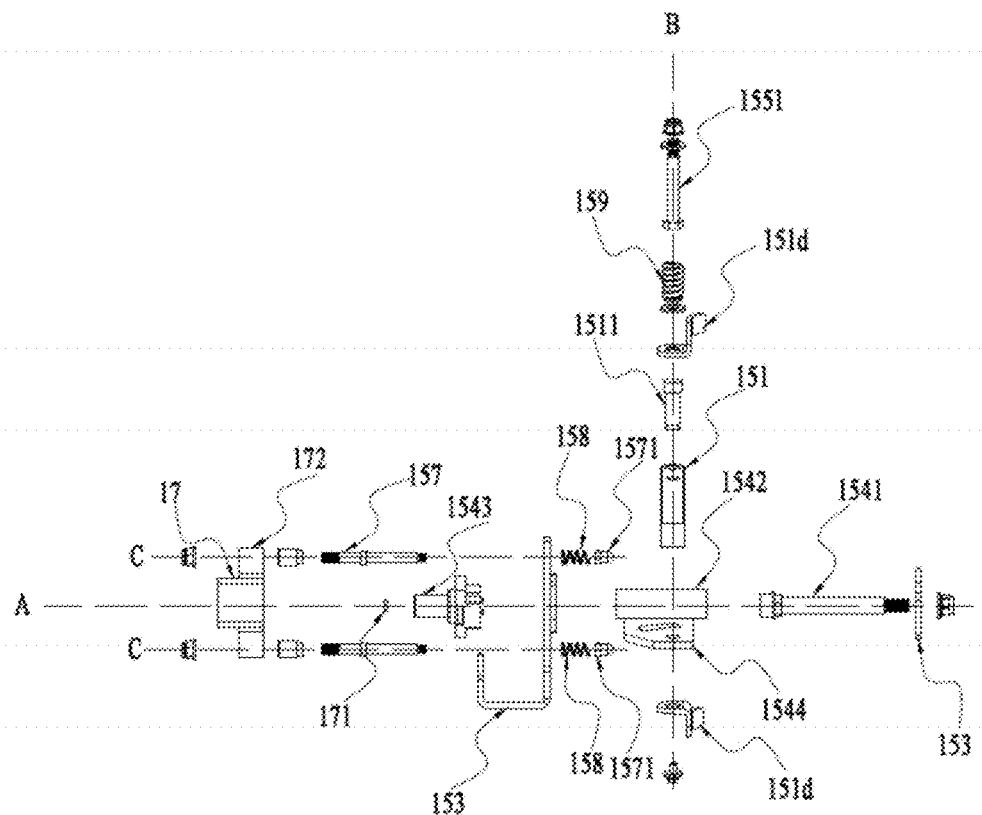
FIG. 6 is an exploded view of the operating apparatus shown in FIG. 5.

As shown in FIGS. 1 to 3, a riding lawn mower can be used for a user to ride. When sitting on the riding lawn mower, the user can effectively and quickly trim lawn, vegetation, etc. by operating the riding lawn mower.

The riding lawn mower includes: a chassis 11, a seat 12, a power output assembly 13, a walking assembly 14, an operating apparatus 15, a power supply device 16 and a control module.

Those skilled in the art can understand that the term "control module" described in this disclosure may include or refer to software or hardware.

Figure 8:
FIG. 8 is a perspective view of the operating apparatus shown in FIG. 5 from another perspective.
Figure 8:
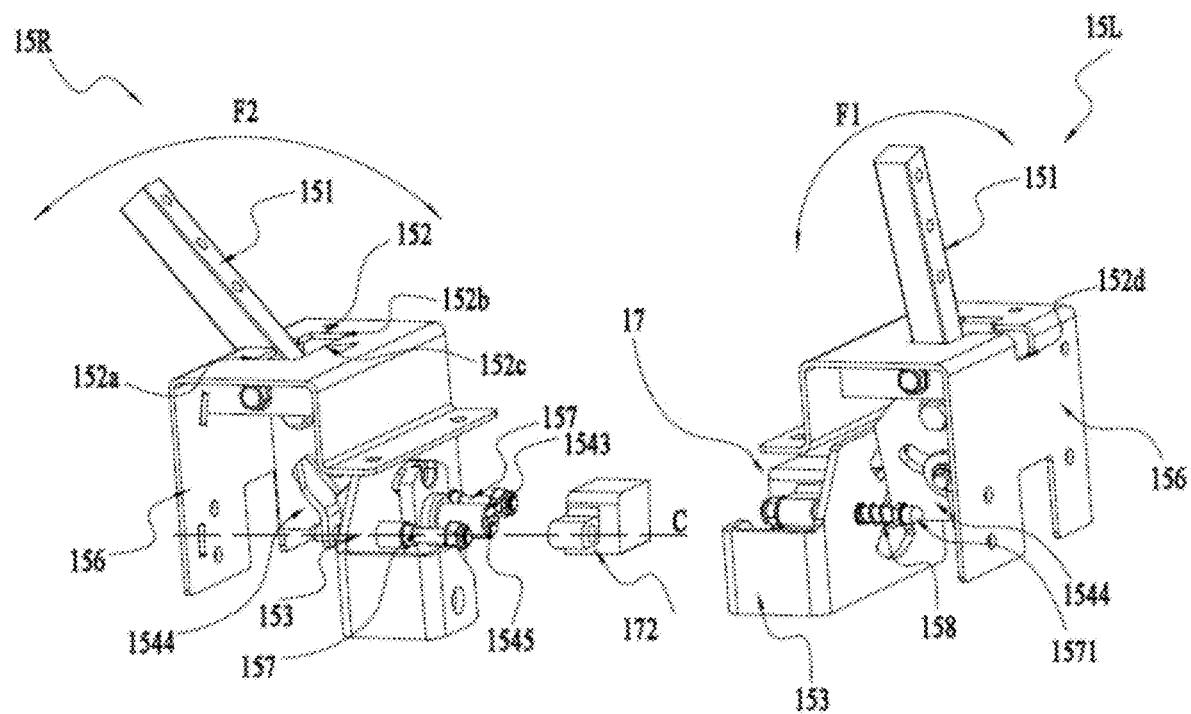
Figure 9:
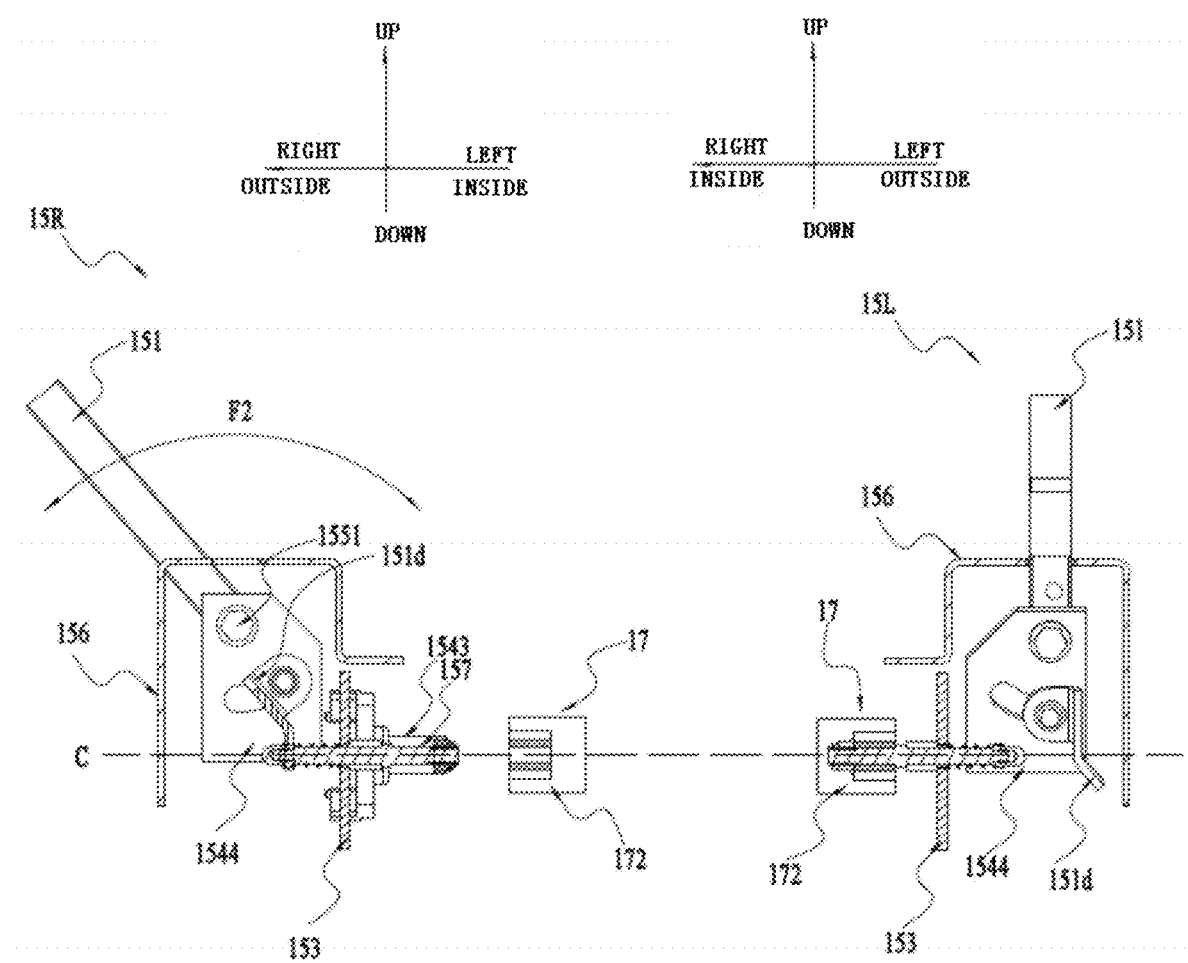
FIG. 9 is a vertical sectional view of the operating apparatus shown in FIG. 8 along the C axis.

In order to facilitate the description of the technical solutions of the present disclosure, the front side, the rear side, the upper side, the lower side, the left side, the right side, the inboard side, and the outboard side are defined as shown in FIG. 8 and FIG. 9. Here, "front side", "rear side", "upper side", "lower side", "left side", "right side", "inboard side", "outboard side" are just convenience words, not restrictive terms.

The chassis is used to support the seat 12. The chassis 11 extends generally in the front-rear direction. The seat 12 is for a user to ride, and the seat is mounted on the chassis. The power output assembly 13 includes an output member for outputting power to achieve a mechanical function. For example, in the present example, the output member may specifically be a mowing member 131, which can realize the function of trimming the lawn. The power output assembly 13 is also connected to the chassis 11. The power output assembly 13 further includes: a first motor for driving the mowing element 131 to rotate at a high speed and a blade for mowing. The power output assembly 13 may include one or more mowing elements 131, and correspondingly, the number of first motors 132 can correspond to the mowing element 131.

The walking assembly 14 is used to enable the riding lawn mower 100 to walk on the lawn. The walking assembly 14 may specifically include: a first travelling wheel 141 and a second travelling wheel 142. The number of the first travelling wheels 141 is 2, and the number of the second travelling wheels 142 is also 2. The walking assembly 14 also includes a second motor for driving the second travelling wheels 142. The number of the second motors is also two. In this way, when the two second motors 143 drive the respective second travelling wheels 142 at different rotational speeds, a speed difference is generated between the two second travelling wheels 142, thereby causing the electric riding lawn mower 100 to turn direction.

The power supply device 16 is for supplying power to the riding lawn mower 100. Specifically, the power supply device 16 is for supplying power to the first motor, the second motor, and other electronic components on the riding lawn mower 100. In some examples, the power supply device 16 is disposed on the rear side of the seat 12. In some examples, the power supply device 16 includes a plurality of battery packs that supply power to power tools.

The riding lawn mower 100 further includes a control module for controlling the operation process of the riding lawn mower 100. The riding lawn mower can at least control the second motor of the walking assembly 14 to control the walking process of the riding lawn mower 100.

The operating apparatus 15 can be operated for the user to set a target state of the riding lawn mower. The target state of the lawnmower 100 includes a forward state, a backward state, a forward speed, a backward speed, a zero speed, a ready state (including, powering the control module, etc.) or exiting from the working state (i.e., parking state), etc. The user controls the walking process, i.e., moving process, of the riding lawn mower 100 by the operating apparatus 15 or decides whether the riding lawnmower 100 enters the working state, i.e., mowing blade active state, or not by the operating apparatus 15.

Specifically, the operating apparatus 15 is used by the user to activate the second motor of the walking assembly 14, thereby controlling the riding lawn mower 100 to walk on the lawn, and the operating apparatus 15 is also used by the user to bring the riding lawn mower 100 into or out of the working state. The number of the operating apparatuses 15 is 2, namely a right operating apparatus 15R and a left operating apparatus 15L, which are used to correspondingly control two second motors to drive two second walking wheels 142 respectively. The components of the right operating apparatus 15R and the left operating apparatus 15L are the same. The right operating apparatus 15R is located at the right hand and the left operating apparatus 15L is located at the left hand of the user for easy access. For convenience of description, the right operating apparatus 15R and the left operating apparatus 15L will not be described separately but will be collectively described as the operating apparatus 15 below.

As an example, the operating apparatus 15 includes: at least one bracket that can be mounted on the riding lawn mower 100; an operating lap bar assembly, including an operating lap bar 151 which is configured to rotate between a forward position, an intermediate position and a rear position about the first axis A in the first direction F1, and rotate between an inboard position and an outboard position about the second axis B in the second direction F2; and a pivoting assembly is for pivotally arranging the operating lap bar on the bracket so that the operating lap bar 151 rotates about the first axis A in the first direction F1 and the second axis B in the second direction F2; wherein the operating apparatus 15 further includes a position detecting module which includes a magnet element and a magnet sensor. The magnet element or the magnet sensor is provided in association with the operating lap bar 151 or the pivoting assembly. The magnet element is spaced away from the magnet sensor, so that when the operating lap bar 151 rotates about the first axis A in the first direction A, a relative movement occurring between the magnet element and the magnet sensor causes a first detection signal related to the position of the operating lap bar 151 in the first direction F1 output from the magnet sensor, and when the operating lap bar 151 rotates about the second axis F2 in the second direction B, a relative movement occurring between the magnet element and the magnet sensor causes a second detection signal related to the position of the operating lap bar 151 in the second direction F2 output from the magnet sensor.

As another example, the operating apparatus 15 of the riding lawn mower 100 includes: at least one bracket that can be mounted on the riding lawn mower 100; an operating lap bar assembly, including an operating lap bar 151 which is configured to rotate between an inboard position and an outboard position; and a pivoting assembly is for pivotally arranging the operating lap bar on the bracket so that the operating lap bar 151 rotates between the inboard position and the outboard position; The operating apparatus 15 further includes a position detecting module including a magnet element and a magnet sensor. The magnet element or the magnet sensor is provided in association with the operating lap bar 151 or the pivoting assembly. The magnet element is spaced away from the magnet sensor so that when the operating lap bar 151 rotates between the inboard position and the outboard position, a relative movement occurring between the magnet element and the magnet sensor causes a detection signal related to the position of the operating lap bar 151 output from the magnet sensor.

As yet another example, the operating apparatus 15 of the riding lawn mower 100 includes: at least one bracket that can be mounted on the riding lawn mower 100; an operating lap bar assembly, including an operating lap bar 151 which is configured to rotate between a forward position, an intermediate position and a rear position; and a pivoting assembly is for pivotally arranging the operating lap bar 151 on the bracket so that the operating lap bar 151 rotates between a forward position, an intermediate position and a rear position; the operating apparatus 15 further includes a position detecting module including a magnet element and a magnet sensor. The magnet element or the magnet sensor is provided in association with the operating lap bar 151 or the pivoting assembly. The magnet element is spaced away from the magnet sensor so that when the operating lap bar 151 rotates between a forward position, an intermediate position and a rear position, a relative movement occurring between the magnet element and the magnet sensor causes a detection signal related to the position of the operating lap bar 151 output from the magnet sensor.

The position arrangement and relative position relationship between the magnetic sensor and the magnetic element in the position detection module can be in multiple ways:

As a first example, the magnetic sensor is provided in association with the operating lap bar 151 so that the magnetic sensor can move, while the magnetic element is fixedly connected to the bracket to prevent the magnetic element from moving; When the operating lap bar 151 rotates between the forward position, the intermediate position, the rear position about the first axis A in the first direction F1, the magnet sensor is driven to rotate relative to the magnetic element, and the magnetic sensor outputs a first detection signal related to the position of the operating lap bar 151 in the first direction F1; when the operating lap bar 151 rotates between the inboard position and the outboard position about the second axis B in the second direction F2, the magnet sensor is driven to rotate relative to the magnetic element, and the magnetic sensor outputs a second detection signal related to the position of the operating lap bar 151 in the second direction F2.

As a second example, the magnetic element is connected in association with the operating lap bar 151 so that the magnetic element can move, while the magnetic sensor is fixedly connected to the bracket to prevent the magnetic sensor from moving; when the operating lap bar 151 rotates between the forward position, the intermediate position, the rear position about the first axis A in the first direction F1, the magnet element is driven to rotate relative to the magnetic sensor, and the magnetic sensor outputs a first detection signal related to the position of the operating lap bar 151 in the first direction F1; when the operating lap bar 151 rotates about the second axis B in the second direction F2, the magnet element is driven to rotate relative to the magnetic sensor, and the magnetic sensor outputs a second detection signal related to the position of the operating lap bar 151 in the second direction F2. Since the magnetic sensor is provided with a connecting wire, when the sensor moves, the connecting wire will also move. Even in the present example, compared with the first example, the magnet sensor can be fixed, so that the magnet sensor will not move and cause movement of the connection wire, increasing the reliability of the system structure.

As a third example, the magnet sensor and the magnet element are connected in association with the pivoting assembly to enable a relative movement of the magnet element and the magnet sensor; when the operating lap bar 151 rotates about the first axis A in the first direction F1, the magnet element is driven to rotate relative to the magnetic sensor, and the magnetic sensor outputs a first detection signal related to the position of the operating lap bar 151 in the first direction F1; when the operating lap bar 151 rotates about the second axis B in the second direction F2, the magnet element is driven to rotate relative to the magnetic sensor, and the magnetic sensor outputs a second detection signal related to the position of the operating lap bar 151 in the second direction F2.

In the above examples, the magnetic sensor may be a magnetoresistive sensor or a Hall sensor. The operating apparatus 15 of the riding lawnmower 100 will be described in detail below.

Referring to FIGS. 4 to 9, as an example of the operating apparatus 15, the magnetic sensor is a magnetoresistive sensor 172. The operating apparatus 15 includes: at least one bracket that can be fixedly mounted on the riding lawn mower 100, specifically, the bracket is fixedly mounted on the chassis 11; an operating lap bar assembly includes an operating lap bar 151 which is configured to rotate between the forward position, the intermediate position, the rear position about the first axis A in the first direction F1, and rotate between the inboard position and the outboard position about the second axis B in the second direction F2; and a pivoting assembly is for pivotally arranging the operating lap bar on the bracket so that the operating lap bar 151 rotates about the first axis A in the first direction F1 and the second axis B in the second direction F2. In addition, in the present example, for the user sitting on the seat 12, the first direction F1 extends in the front-rear direction, and the second direction F2 extends in the left-right direction. Of course, in other examples, the first direction F1 may not extend in the front-rear direction, and the second direction F2 may not extend in the left-right direction.

As an example of the position detecting module 17 of the riding lawn mower 100, the position detecting module 17 includes a magnetic element 171 and a magnetic sensor 172. The magnet element 171 or the magnet sensor 172 is provided in association with the operating lap bar 151 or the pivoting assembly. The magnet element 171 is spaced away from the magnet sensor 172, so that when the operating lap bar 151 rotates about the first axis F1 in the first direction A, a relative movement occurs between the magnet element 171 and the magnet sensor 172 for detecting whether the operating lap bar 152 is in the forward position, the intermediate position or the rear position in the first direction F1, and when the operating lap bar 151 rotates about the second axis F2 in the second direction B, a relative movement occurs between the magnet element 171 and the magnet sensor 172 for detecting whether the operating lap bar 152 is in the inboard position or the outboard position in the second direction F1.

Further, referring to the operating apparatus 15 shown in FIGS. 4 to 9, which includes a first bracket 153 and an operating lap bar assembly. The first bracket 153 can be fixedly mounted on the chassis 11 of the riding lawn mower 100 for supporting the operating lap bar assembly.

The operating lap bar assembly includes an operating lap bar 151 and a pivoting assembly. In some examples, the operating lap bar 151 includes a handle portion 151a and a connecting rod 151b. Among them, the handle portion 151a is for the user to operate, and the connecting rod 151b is located on the lower side of the handle portion 151a and is connected in association with the pivoting assembly. In some examples, the handle portion 151a and the connecting rod 151b are an integral structure. In other examples, the handle portion 151a and the connecting rod 151b are fixedly connected by a connecting member 151c.

In some examples, the pivoting assembly includes a first pivoting module 154 and a second pivoting module 155. Wherein the first pivoting module is installed on the first bracket 153, and the second pivoting module 155 is installed on the first pivoting module 154.

The first pivoting module 154 includes a first pivot shaft 1541 which is fixedly mounted on the first bracket 153, and the first pivot shaft 1541 defines the first axis A. In some examples, the first pivoting module 154 further includes a shaft sleeve 1542 and a position detecting module mounting portion 1543. The first pivot shaft 1541 partially surrounds the first pivot shaft 1541 and is rotatable about the first pivot shaft 1541. The position detecting module mounting portion 1543 is used to at least partially install the position detecting module 17. The position detecting module mounting portion 1543 is fixedly connected to the shaft sleeve 1542 and can rotate with the rotation of the shaft sleeve 1542. In some examples, the first pivoting module 154 further includes a second bracket 1544 for supporting the second pivoting module 155, and the second bracket 1544 is fixedly mounted on the shaft sleeve 1542 or the second bracket 1544 and the shaft sleeve 1542 are an integral structure. The first pivoting module 154 is for the operating lap bar 151 to rotate about the first axis A in the first direction F1, and the first axis A is the axis of the first pivot shaft 1541.

The second pivoting module 155 includes a second pivot shaft 1551 which is fixedly mounted on the first pivoting module 154, and the second pivot shaft 1551 defines the second axis B. In some specific examples, the second pivot shaft 1551 of the second pivoting module 155 is fixedly mounted on the second bracket 1544 of the first pivoting module 154. The operating lap bar 151 is pivotally mounted on the second pivot shaft 1551 and can rotate around the second pivot shaft 1551. In some examples, the operating lap bar 151 is provided with a perforation through which the second pivot shaft 1551 passes, and the operating lap bar 151 can rotate about the second pivot shaft 1551. The second pivoting module 155 allows the operating lap bar 151 to rotate about the second axis B in the second direction F2, and the second axis B is the axis of the second pivot shaft 1551.

The position of the operating lap bar 151 in the first direction F1 and the second direction F2 are the target speed or target state of the second motor which is set by the user and the target state of the riding lawnmower 100 (the ready state or exit from working state, etc.). The position in the first direction F1 and the position in the second direction F2 may include a plurality of different positions in each direction.

In the present example, the position in the first direction F1 includes a forward position, a intermediate position and a rear position, respectively corresponding to the forward, zero-speed, and reverse state of the riding lawn mower 100. The position in the second direction F2 includes an inboard position and an outboard position, respectively corresponding to the working state (i.e., the ready state or the zero-speed state) and the non-working state (i.e., the parking state).

Among them, the operating lap bar 151 provides multiple target traveling speeds between the forward position and the intermediate position in a way forward, and the operating lap bar 151 provides multiple target traveling speeds between the intermediate position and the rear position in a way backward; the inboard position of the operating lap bar 151 in the second direction F2 coincides with the intermediate position of the operating lap bar 151 in the first direction F1, and the user can apply power to the riding lawnmower 100 when the operating lap bar in the outboard position.

When the operating lap bar 151 rotates in the first direction F1 about the first axis A between the forward position, the intermediate position and the rear position, the first pivoting module 154 is driven to rotate about the first axis A in the first direction F1. When the operating lap bar 151 rotates between the inboard position and the outboard position about the second axis B in the second direction F2, the second pivoting module 155 is driven to rotate about the second axis B in the second direction F2.

The forward position, the intermediate position and the rear position herein in the first direction F1 refer to the position where the upper part of the operating lap bar 151 above the first axis A is located, and the inboard position and the outboard position herein in the second position refer to the position where the upper part of the operating lap bar 151 above the second axis B is located.

The position detecting module 17 is at least partially associated with the bracket and/or pivoting assembly for detecting the position of the operating lap bar 151 in the first direction F1, including the forward position, the intermediate position and the rear position, and the position of the operating lap bar 151 in the second direction F2, including the inboard position and the outboard position.

Wherein the forward position may include multiple forward positions, including at least a maximum forward position; the rear position includes multiple rear positions, including at least a maximum rear position. For example, when the operating lap bar 151 is at the maximum forward position, the target state of the second motor is the maximum forward speed; when the operating lap bar 151 is at the maximum rear position, the target state of the second motor is the maximum reverse speed; when the operating lap bar 151 is at the intermediate position, the target state of the second motor is the zero-speed state; when the operating lap bar 151 is at the inboard position, the state of the riding lawn mower is in the ready state, that is, in some specific examples, the inboard position is close to or coincides with the intermediate position, thus the target state of the second motor is the zero-speed state; when the operating lap bar 151 is at the outboard position, the state of the riding lawn mower is to exit from work state. The user sets the corresponding target speed or target state of the second motor by moving the operating lap bar 151, and controls the operation of the second motor, so that the target speed or target state of the corresponding second motor is also from the target rotation speed or target state which is controlled by the position of the operating lap bar 151 set by the user.

Figure 33:
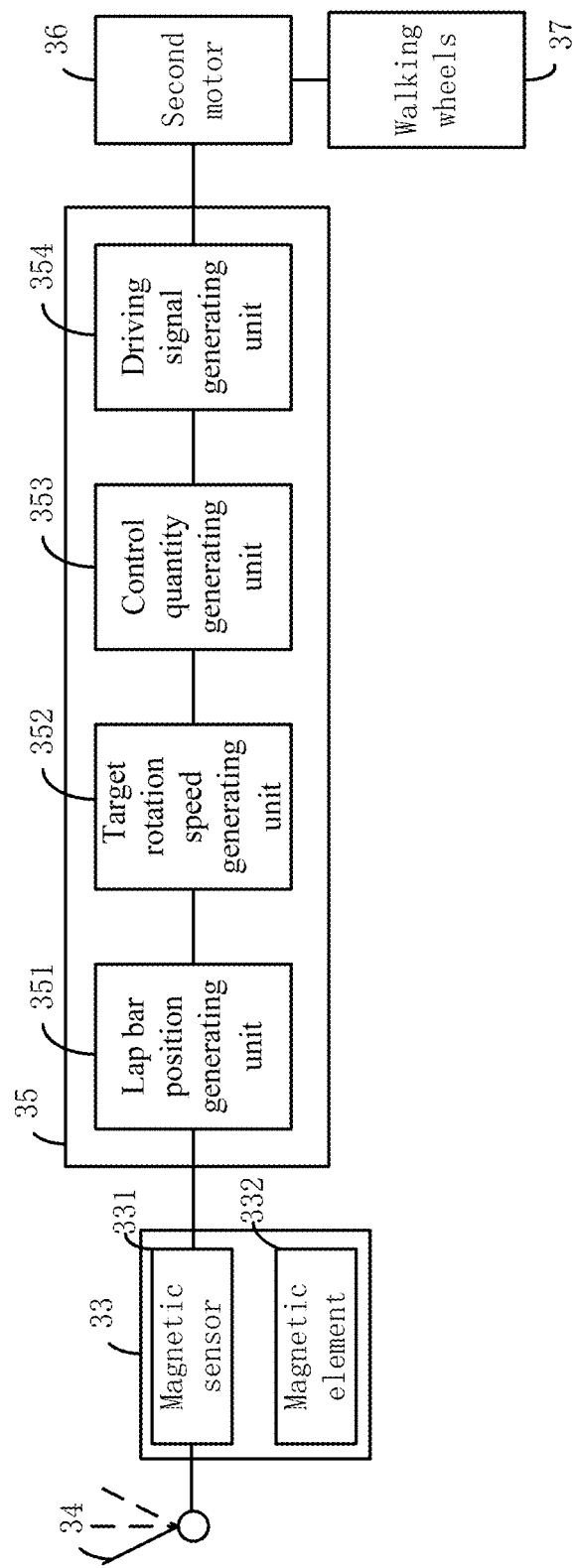
FIG. 33 is a principle block diagram of the operating apparatus of the present disclosure for realizing the control of the walking wheels.

The position detecting module 17 is electrically connected to the control module 35 (FIG. 33). The position detection module 17 detects the position of the operating lap bar 151 and outputs a detection signal to the control module 35. The control module 35 obtains the target rotation speed or target state of the corresponding second motor which is set by the operating lap bar 151 and the target state of the second walking wheel driven by the second motor by way of table look-up or calculation, and then outputs a control signal to the corresponding second motor or other electronic components of the riding lawnmower 100, so that the riding lawn mower 100 is running in the target state set by the user through the operating lap bar 151. In this way, the target state of the second motor is set according to the positions of the operating lap bar 151 in the two directions, respectively, so as to reach the target state set by the operating lap bar 151, thereby realizing the state of forward, rear, stop, turn, park and preparation, etc. of the riding lawnmower 100.

The position detecting module 17 may also be a potentiometer which is well known to those skilled in the art or any other suitable device capable of measuring displacement or rotation. In the present example, the position detecting module 17 includes a magnetic element 171 and a magnetoresistive sensor 172. The magnet element 171 is spaced away from the magnet sensor 172, and a relative movement and rotation can generate between the magnet element 171 and the magnet sensor 172. The position detection module 17 detects the position of the operating lap bar 151 by utilizing the magnetoresistance effect.

The magnetic element 171 is arranged in association with the magnetoresistive sensor 172, so that when the operating lap bar 151 rotates about the first axis A in the first direction F1, a relative rotation occurs between the magnet element 171 and the magnetoresistive sensor 172, and the magnetoresistive sensor 172 outputs a first detection signal related to the forward position, the intermediate position and the rear position of the operating lap bar 151 in the first direction F1; and when the operating lap bar 151 rotates about the second axis B in the second direction F2, the operating lap bar 151 can drive the magnetic element 171 and the magnetoresistive sensor 172 to move relative to each other, and the magnetoresistive sensor 172 outputs a second detection signal related to the inboard position and the outboard position of the operating lap bar 151 in the second direction F2. The first detection signal and the second detection signal are output to the controllable module 35 (FIG. 33), and the control module 35 (FIG. 33) determines the position of the operating lap bar 151 according to the first detection signal and/or the second detection signal and outputs a control signal to the corresponding second motor to control the second travelling wheel to run at the target speed or target state set by the operating lap bar 151.

The first detection signal contains the rotation angle information of the magnetic element 171 or the magnetoresistive sensor 172 associated with the rotation of the operating lap bar 151 in the first direction F1. In this way, the position of the operating lap bar 151 is detected, including the forward position, the intermediate position and the rear position.

The second detection signal contains a first signal and a first away signal. Specifically, when the operating lap bar 151 moves from the outboard position to the inboard position, the magnetic element 171 and the magnetoresistive sensor 172 approach each other until the magnetoresistive sensor 172 outputs the first signal, and the control module determines that the operating lap bar 151 is at the inboard position; when the operating lap bar 151 moves from the inboard position to the outboard position, the magnetic element 171 and the magnetoresistive sensor 172 move away from each other until the magnetoresistive sensor 172 outputs the second signal, and the control module determines that the operation lap bar 151 is in the outboard position.

The value or calculated value of the first signal is greater than a first preset threshold, and the value or calculated value of the second signal is less than a second preset threshold. In some examples, the first preset threshold is greater than or equal to the second preset threshold.

According to the above, that is to say, the arrangement of the magnetic element 171 and the magnetoresistive sensor 172 can make the magnetic element 171 and the magnetoresistive sensor 172 produce relative movement and relative rotation when the operating lap bar 151 rotates, the followings are several implementations of the arrangement of the magnetic element 171 and the magnetoresistive sensor 172:

Example 1

The magnetic element 171 is fixedly connected to the first pivoting module 154 so that the magnetic element 171 can't move but it can rotate following the first pivoting module 154, and the magnetoresistive sensor 172 is connected in association with the second pivoting module 155 so that the magnetoresistive sensor 172 can move but cannot rotate. In this way, when the operating lap bar 151 rotates about the first axis A in the first direction F1, the operating lap bar 151 drives the first pivoting module 154 to rotate, thereby driving the magnetic element 171 to rotate, so that a relative movement occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the second pivoting module 155 to rotate, thereby driving the magnetoresistive sensor 172 to move, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

Example 2

The magnetic element 171 is fixedly connected to the bracket so that the magnetic element 171 cannot move and cannot rotate, and the magnetoresistive sensor 172 is associated with the pivoting assembly to enable the magnetoresistive sensor 172 to move and rotate. In this way, when the operating lap bar 151 rotates about the first axis A in the first direction F1, the operating lap bar 151 drives the pivoting assembly to rotate, thereby driving the magnetoresistive sensor 172 to rotate, so that a relative movement occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the pivoting assembly to rotate, thereby driving the magnetoresistive sensor 172 to move, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

Example 3

The magnetoresistive sensor 172 is fixedly connected to the first pivoting module 154 so that the magnetoresistive sensor 172 can't move but it can rotate following the first pivoting module 154, and the magnet element 171 is connected in association with the second pivoting module 155 so that the magnet element 171 can move but cannot rotate. In this way, when the operating lap bar 151 rotates about the first axis A in the first direction F1, the operating lap bar 151 drives the first pivoting module 154 to rotate, thereby driving the magnetoresistive sensor 172 to rotate, so that a relative movement occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the second pivoting module 155 to rotate, thereby driving the magnet sensor 171 to move, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

Example 4

The magnetoresistive sensor 172 is fixedly connected to the bracket so that the magnetoresistive sensor 172 cannot move and cannot rotate, and the magnet element 171 is associated with the pivoting assembly to enable the magnet element 171 to move and rotate. In this way, when the operating lap bar 151 rotates about the first axis A in the first direction F1, the operating lap bar 151 drives the pivoting assembly to rotate, thereby driving the magnet element 171 to rotate, so that a relative movement occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the pivoting assembly to rotate, thereby driving the magnet element 171 to move, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

Example 5

The magnetoresistive sensor 172 and the magnet element 171 are associated with the pivoting assembly so that a relative movement and a relative rotation occur between the magnet element 171 and the magnetoresistive sensor 172. In this way, when the operating lap bar 151 rotates about the first axis A in the first direction F1, the operating lap bar 151 drives the pivoting assembly to rotate, so that a relative rotation occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the pivoting assembly to rotate, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

The above-mentioned examples and other structural designs that can carry out the relative movement and relative rotation of the magnetic element 171 and the magnetoresistive sensor 172 when the operating lap bar 151 rotates also fall within the protection scope of the present disclosure.

Owing to space constraints, the present example only uses the above example 1 as an example to specifically describe the operating apparatus 15, that is, the magnetic element 171 is fixedly connected to the first pivoting module 154 so that the magnetic element 171 cannot move, and the magnetoresistive sensor 172 is associated with the second pivoting module 155 to enable the magnetoresistive sensor 172 to move. From these details, those of skill in the art will understand the manner in which the further described examples are intended to operate.

Specifically, the magnetic element 171 is mounted on the position detecting module mounting portion 1543 of the first pivoting module 154, and the end position of the position detecting module mounting portion 1543 is provided with a groove 1545 into which the magnetic element 171 is embedded. When the operating lap bar 151 rotates about the first axis A, the first pivoting module 154 is driven to rotate, thereby driving the magnetic element 171 which is in the position detecting module mounting portion 1543 to rotate. When the operating lap bar 151 rotates about the first axis A, the second pivoting module 155 does not move, and at this moment, the magnetoresistive sensor 172 which is associated with the second pivoting module 155 also does not move. In this way, when a relative rotation occurs between the magnet element 171 and the magnetoresistive sensor 172, and the magnetoresistive sensor 172 outputs the first detection signal according to the angle of relative rotation.

The magnetoresistive sensor 172 is connected in association with the second pivoting module 155 through a coupling mechanism, when the operating lap bar 151 rotates about the second axis B, the magnetoresistive sensor 172 is driven to move. In some specific examples, the coupling mechanism includes a mounting shaft 157 for mounting the magnetoresistive sensor 172 on the first bracket 153, and the mounting shaft can move in the axis C-direction which is parallel to the axis A under the pushing of the operating lap bar 151 to drive the magnetoresistive sensor 172 to move along the axis C. In some examples, the axis C is the centerline of the mounting shaft 157. The magnetoresistive sensor 172 is fixedly mounted on the mounting shaft 157. When the operating lap bar 151 rotates about the second axis B, the operating lap bar 151 pushes the mounting shaft 157, thereby driving the magnetoresistive sensor 172 to move away from or close to the magnetic element 171, and the magnetoresistive sensor 172 outputs the second detection signal. The second detection signal includes the first signal when the magnetoresistive sensor 172 and the magnet element 171 are close together and the second signal when the magnetoresistive sensor 172 and the magnet element 171 are far away from each other, which represents the operating lap bar 151 in the second direction F2 is in the inboard position or the outboard position. In this way, the position of the operating lap bar 151 in the second direction F2 is detected, including the inner position and the outer position.

Preferably, the mounting shaft 157 is provided below the operating lap bar 151. When the operating lap bar 151 rotates from the inboard position to the outboard position about the second axis B, the lower portion of the operating lap bar 151 pushes the mounting shaft 157 to move inward, thereby driving the magnetoresistive sensor 172 to move inward. Since the magnetic element 171 is fixedly connected to the first pivoting module 154, when the operating lap bar 151 rotates around the second axis B, the first pivoting module 154 does not move, and the magnetic element 171 associated with the first pivoting module 154 does not act, so that when the magnetoresistive sensor 172 moves away from the magnetic element 171 until the operating lap bar 151 moves to the outboard position, the magnetoresistive sensor 172 outputs the second signal indicating that the operating lap bar 151 is located at the outboard position, and the control module receives the second signal and determines that the operating lap bar 151 is at the outboard position, and the control module outputs a control signal to operate the riding lawn mower 100 into a non-working state, for example, the motor stops working.

Similarly, when the operating lap bar 151 rotates from the outboard position to the inboard position about the second axis B, the magnetoresistive sensor 172 approaches the magnetic element 171 until the operating lap bar 151 moves to the inboard position, and the magnetoresistive sensor 172 outputs a first signal indicating that the operating lap bar 151 is located at the inboard position, and the control module receives the first signal and determines that the operating lap bar 151 is in the inboard position, and the control module outputs a control signal to operate the riding lawn mower 100 into a working state, for example, powering on the motor. The number of the mounting shaft 157 may be one or more. As a preferred solution, the number of the mounting shaft 157 is 2, which is advantageous for fixing the magnetoresistive sensor 172 and maintaining a balanced state.

In order to enable the operating lap bar 151 to accurately contact and push the mounting shaft 157, in some examples, the coupling mechanism further includes a stopper 151*d* which is disposed on the operating lap bar and near the mounting shaft 157. Therefore, when the operating lap bar 151 rotates between the inboard position and the outboard position in the second direction F2, the stopper 151*d* can resist and push the mounting shift 157 to move in the direction of the axis C to drive the movement of the magnetoresistive sensor 172. The number of stoppers 151*d* corresponds to the number of mounting shafts 157 one-to-one. In some examples, the stopper 151*d* is fixed to the lower portion of the operating lap bar 151 by a fixing member 1511. In some examples, the stopper 151*d* is fixed to the lower portion of the operating lap bar 151 by a bolt and screw assembly.

In some examples, the operating apparatus 15 further includes a damping device 158 which is mounted on the mounting shaft 157 and is located between the operating lap bar 151 and the first bracket 153 for preventing the mounting shaft 157 from moving along the direction of the axis C. The resistance direction of the damping device 158 is parallel to the axis A, and it can be in a compressed or released state as the mounting shaft 157 moves in the direction of the axis C of the mounting 157. As a preferred solution, the damping device 158 is sleeved on the mounting shaft 157 at its one end to a restricting member 1571 which is fixed to the restricting member 1571, and the other end contacts or is fixed to the first bracket 153. The lower portion of the operating lap bar 151 pushes the mounting shaft 157 to move when the operating lap bar rotates from the inboard position to the outboard position about the second axis B in the second direction F2, such that the damping device 158 moves with the mounting shaft 157 and the damping device 158 is in a compressed state; while the lower portion of the operating lap bar moves away from the mounting shaft 157 when the operating lap bar 151 rotates from the outboard position to the inboard position about the second axis B in the second direction F2, such that the damping device 158 is gradually released until it returned to its original state. That is to say, when the operating lap bar 151 needs to return to the inboard position, the damping device 158 can help the operating lap bar 151 to return to the inboard position immediately, saving effort. As a preferred solution, the damping device 158 includes a compression spring.

In some examples, the operating apparatus 15 further includes a locking member for holding the operating lap bar 151 at the outboard position to prevent the operating lap bar 151 from returning to the inboard position in the ready state, even the forward position and the rear position due to an erroneous operation, which prevents security incidents.

With the above arrangement, the position detecting module 17 is associated with the position of the operating lap bar 151 in the first direction F1 and in the second direction F2 so that the position detecting module 17 detects the position of the operating lap bar, and outputs the detection signal to the control module to control the corresponding second motor reach the target state or target speed which is set by the operating lap bar 151.

Specifically, when the user uses the operating apparatus 15 to rotate the operating lap bar 151 about the first axis A in the first direction F1, the operating lap bar 151 drives the first pivoting module 154 to rotate about the first axis A, thus, the magnet element 171 which is on the first pivoting module 154 is driven to rotate, but the second pivoting module 155 does not move. The magnetic element 171 and the magnetoresistive sensor 172 are located close to each other. A relative motivation occurs between the magnetic element 171 and the magnetoresistive sensor 172 when the magnet element 171 rotates, such that the magnetoresistive sensor 172 outputs the first detection signal which includes information on the rotation angle of the magnetic element 171 (and the operating lap bar 151), that is, it includes information on the location of the operating lap bar 151 in the first direction F1.

On the other hand, when the user operates the operating lap bar 151 to move it from the inboard position to the outboard position in the second direction F2, the operating lap bar 151 drives the second pivoting module 155 to rotate around the second axis B and pushes the mounting shaft 157 to move in the direction of the axis C of the mounting shaft 157, thereby driving the magnetoresistive sensor 172 which is mounted on the mounting shaft 157 to move, and the magnetic element 171 on the first pivoting module 154 rotates, while the magnetoresistive sensor 172 is away from the magnetic element 171 since the first pivoting module 154 does not move, such that the magnetoresistive sensor 172 outputs the second detection signal which includes information on the position information that the magnetoresistive sensor 172 is away from the magnetic element 17, that is, it includes information on the location of the operating lap bar 151 in the second direction F1.

Of course, it will be appreciated by those skilled in the art that the mounting position of the magnetic element 171 and the magnetoresistive sensor 172 of the position detecting module 17 is not limited to the above manner, as long as the magnetic element 171 and the magnetoresistive sensor 172 are arranged at intervals and in association, so that the magnetic element 171 and the magnetoresistive sensor 172 are associated with the position of the operating lap bar 151 in the first direction F1 and the second direction F2, and such that relative movement and relative rotation can be generated between the magnetic element 171 and the magnetoresistive sensor 172 when the operating lap bar 151 rotates. The above falls within the protection scope of the present disclosure.

Referring to FIGS. 8 to 9, in some examples, the operating apparatus 15 further includes a guide device 152 for guiding and/or defining the position of the operating lap bar 151. The guide device 152 includes a forward position guide member 152a, a intermediate position guide member 152c, a rear position guide member 152b and an outboard position guide 152d. Wherein the forward position guide member 152a is used to guide and/or restrict the movement of the operating lap bar 151 to the forward position in the first direction F1, and the intermediate position guide member 152c is used to guide and/or restrict the movement of the operating lap bar 151 to the intermediate position in the first direction F1 and the inboard position in the second direction F2, and the rear position member 152b is used to guide and/or restrict the operating lap bar 151 to the rear position in the first direction F1, and the outboard position guide 152d is used to guide and/or restrict the operating lap bar 151 to move to the outboard position in the second direction F2. As a preferred solution, the guide device 152 has a T-shaped groove, and the operating lap bar 151 can pass through the T-shaped groove and move within the T-shaped groove.

In some examples, the operating apparatus 15 further includes a third bracket 156 that can be fixedly mounted on the riding lawnmower 100 for fixing the guide device 152 on the riding lawnmower 100.

In some examples, the operating apparatus 15 further includes a second damping device 159 which is installed between the operating lap bar 151 and the chassis 11 of the riding lawn mower 100 for preventing the operating lap bar 151 from rotating about the first axis A in the first direction F1.

The present example utilizes the magnetoresistance effect for position detection. The position detecting module 17 includes a magnetoresistive sensor 172 and a magnetic element 171. In some specific examples, the magnetoresistive sensor 172 is a sensor using the tunnel magnetoresistive effect (TMR), hereinafter referred to as TMR sensor.

Figure 10A:
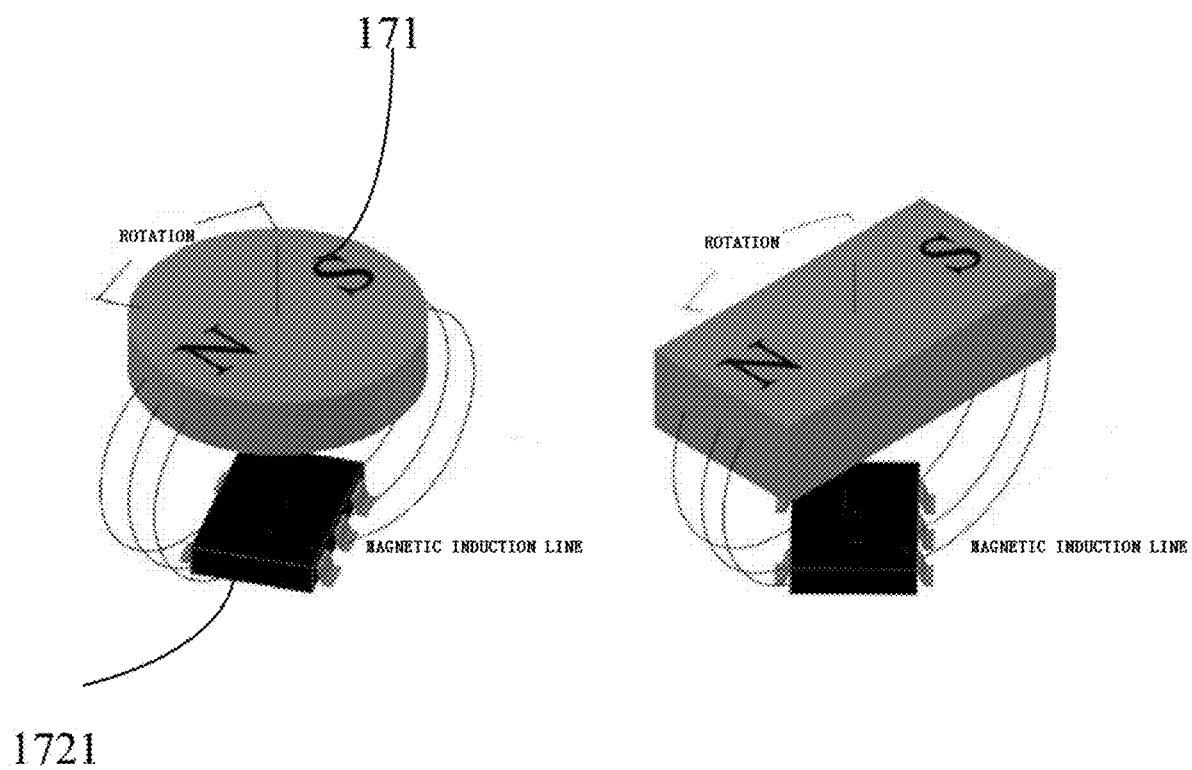
FIGS. 10A and 10B are schematic diagrams of the position detecting module according to an example.
Figure 10B:
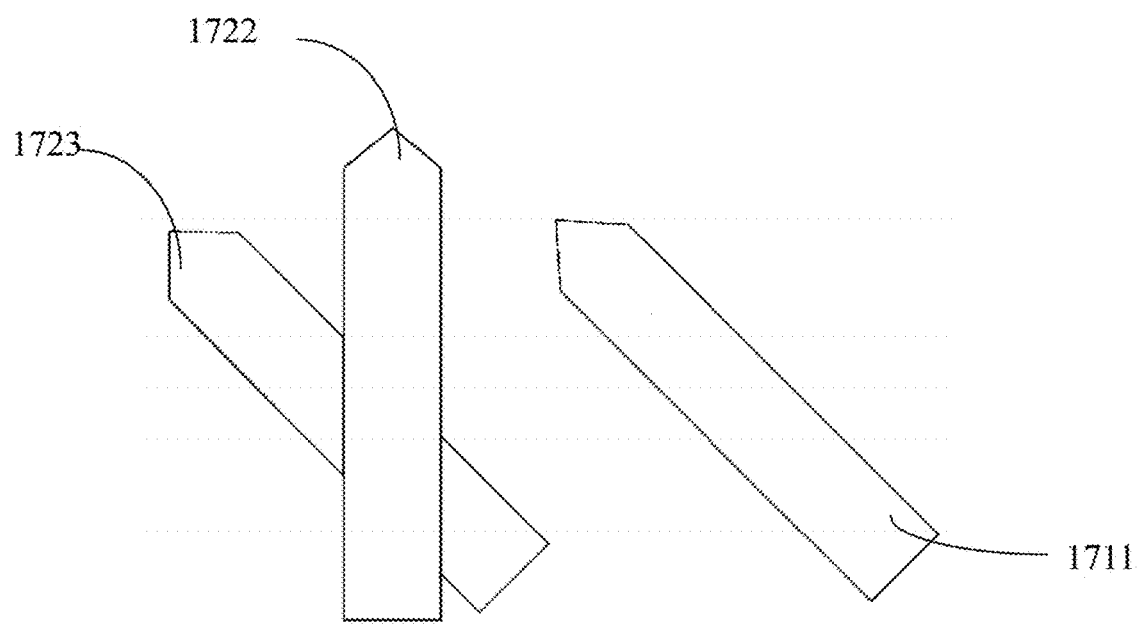

Referring to FIGS. 10A and 10B, specifically, the magnetoresistive sensor 172 has a chip 1721 that can generate an internal magnetic field, including a first magnetic layer and a second magnetic layer. Wherein the magnetic field direction of the first magnetic layer is fixed, and the second magnetic layer is magnetized by the magnetic element 171 and its magnetic field direction is parallel to the magnetic field direction of the magnetic element 171.

The specific working principle of the position detecting module 17 will be specifically described below by taking the first example of the arrangement of the magnetic element 171 and the magnetoresistive sensor 172 as an example.

The magnetic element 171 is fixedly connected to the first pivoting module 154 so that the magnetic element 171 cannot move but it can rotate following the first pivoting module 154, and the magnetoresistive sensor 172 is associated with the second pivoting module 155 so that the magnetoresistive sensor 172 can move but not turn. In this way, when the operating lap bar 151 rotates about the first axis A in the first direction F1, the operating lap bar 151 drives the first pivoting module 154 to rotate, thereby driving the magnetic element 171 to rotate, so that a relative movement occurs between the magnet element 171 and the magnetoresistive sensor 172, and the magnetoresistive sensor 172 outputs a first detection signal which is related to the forward position, the intermediate position and the rear position of the operating lap bar 151 in the first direction F1; when the operating lap bar 151 rotates between the inboard position and the outboard position about the second axis B in the second direction F2, the operating lap bar 151 drives the second pivoting module 155 to rotate, thereby driving the magnetoresistive sensor 172 to move, so that a relative movement occurs between the magnet element 171 and the magnetoresistive sensor 172, and the magnetoresistive sensor 172 outputs a second detection signal which is related to the inboard position and the outboard position of the operating lap bar 151 in the second direction F2.

Figure 11:
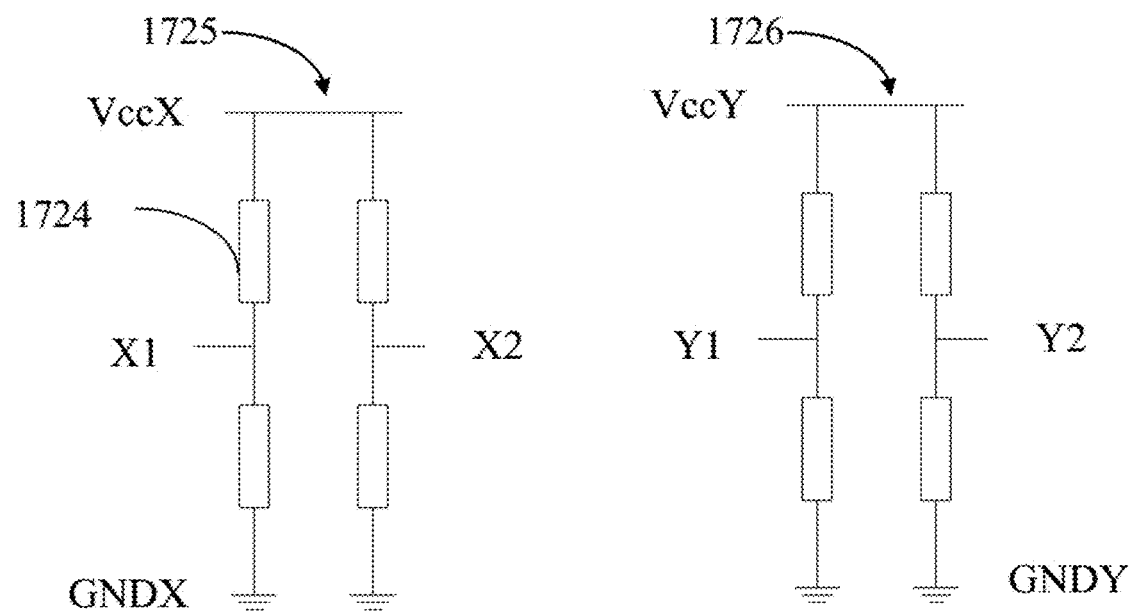
FIG. 11 is a schematic diagram of the electric bridge composed of sensing elements of the magnet sensor shown in FIG. 10.

Referring to FIG. 11, the magnetoresistive sensor 172 is further provided with a sensor assembly, and the sensor assembly can output an electrical signal which is related to the position of the operating lap bar 151 according to the angle between the magnetic field directions of the first magnetic layer and the second magnetic layer. The angle between the magnetic field directions of the first magnetic layer and the second magnetic layer is the angle that the magnetic element 171 rotates relative to the magnetoresistive sensor 172, and the magnetic element 171 is associated with the first pivoting module 154 and the operating lap bar 151. In this way, the angular position of the operating lap bar 151, that is, the angle through which the operating lap bar 151 turns can be detected.

Figure 13:
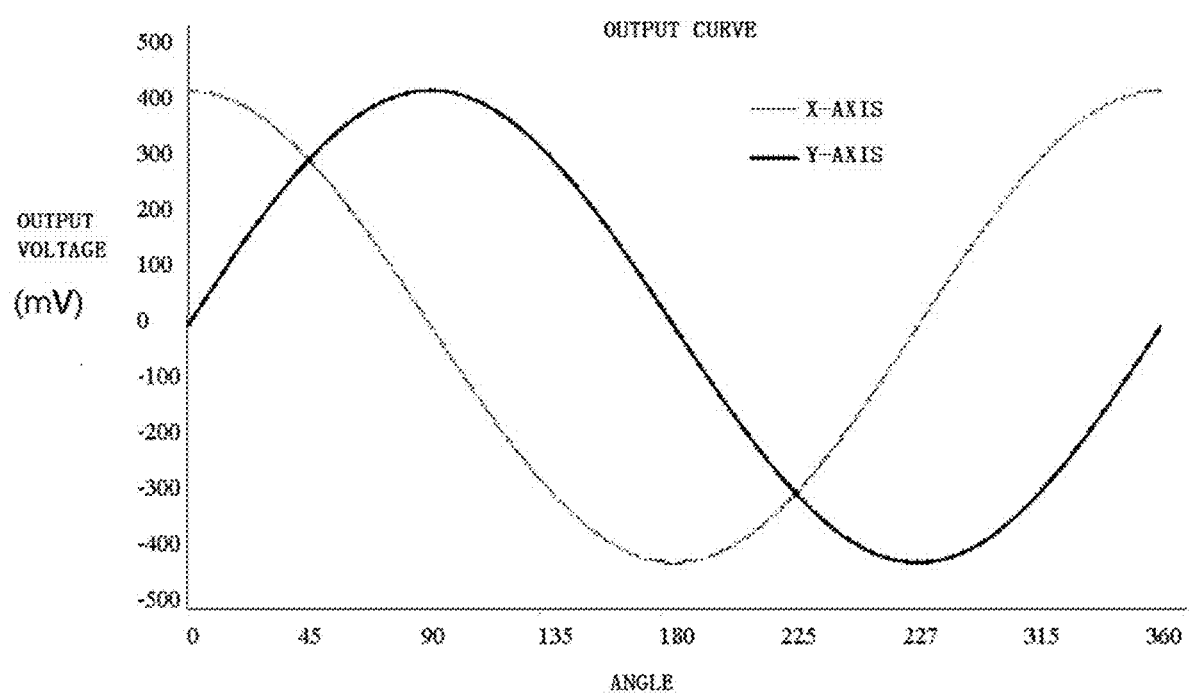
FIG. 13 is the corresponding relationship curve between the output voltage of the magnet sensor and the angle measurement value.
Figure 14:
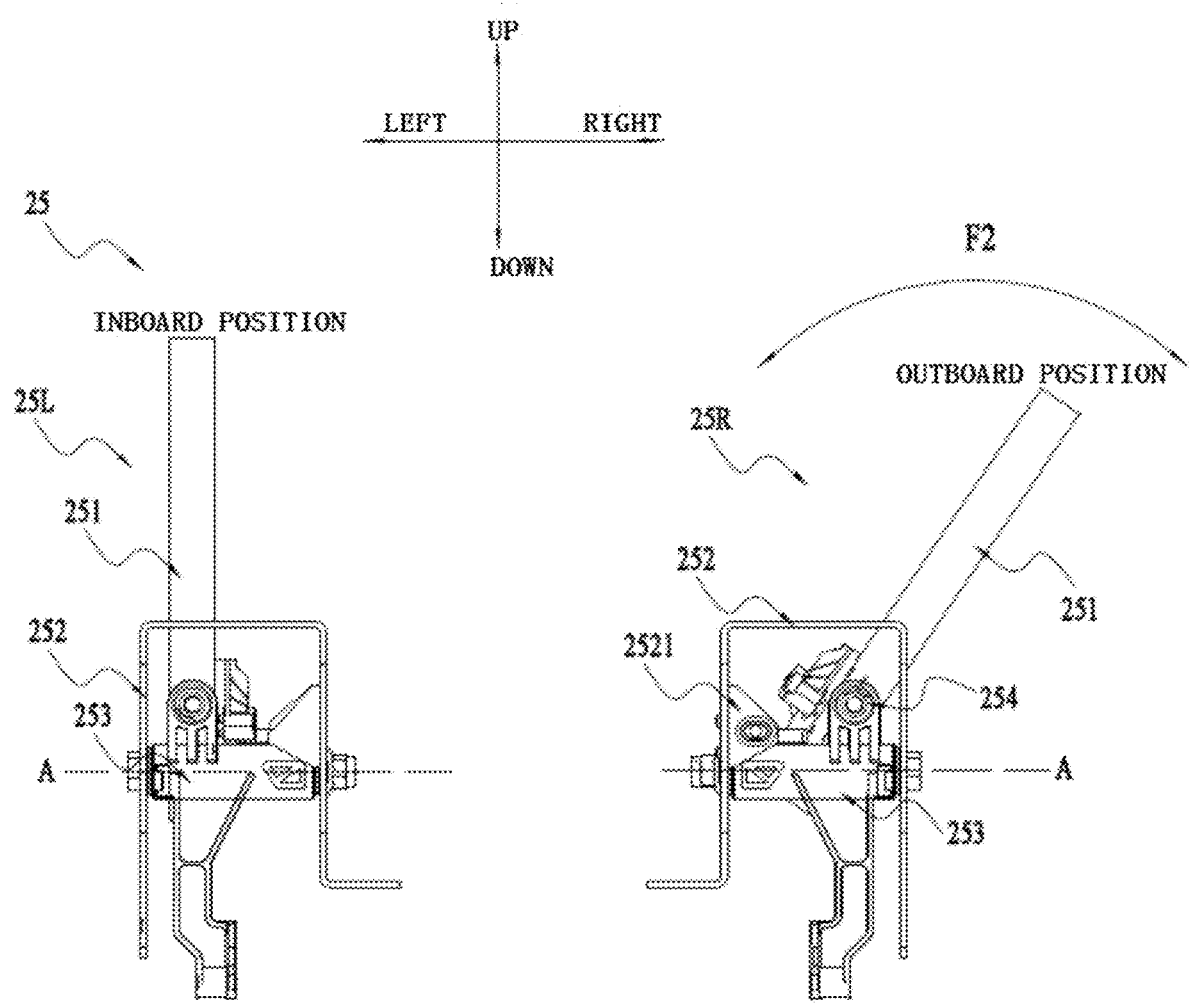
FIG. 14 is a perspective view of the operating apparatus of another example with the operating lap bar in a position in the second direction.
Figure 15:
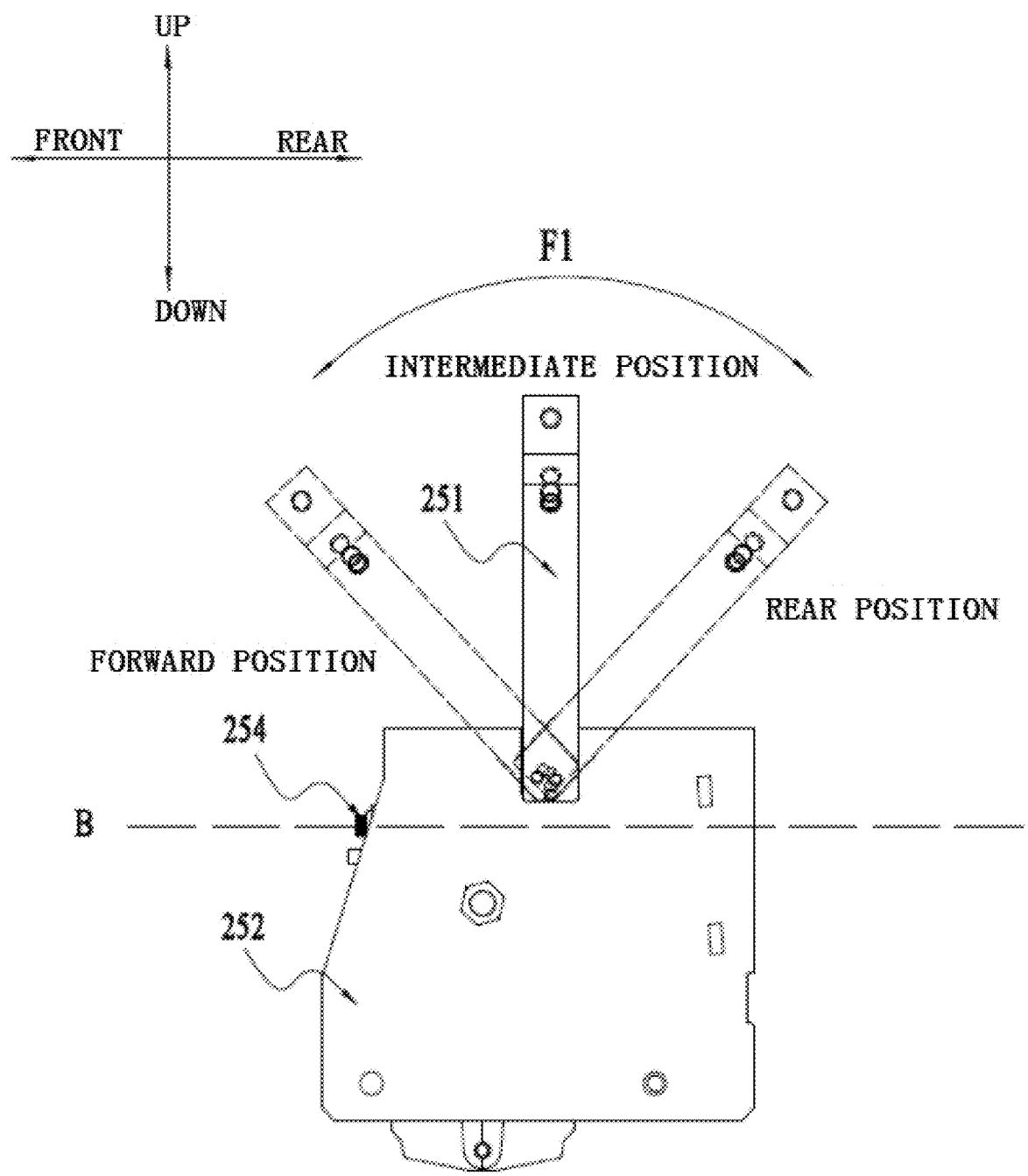
FIG. 15 is a perspective view of the operating apparatus shown in FIG. 14 from another perspective.
Figure 16:
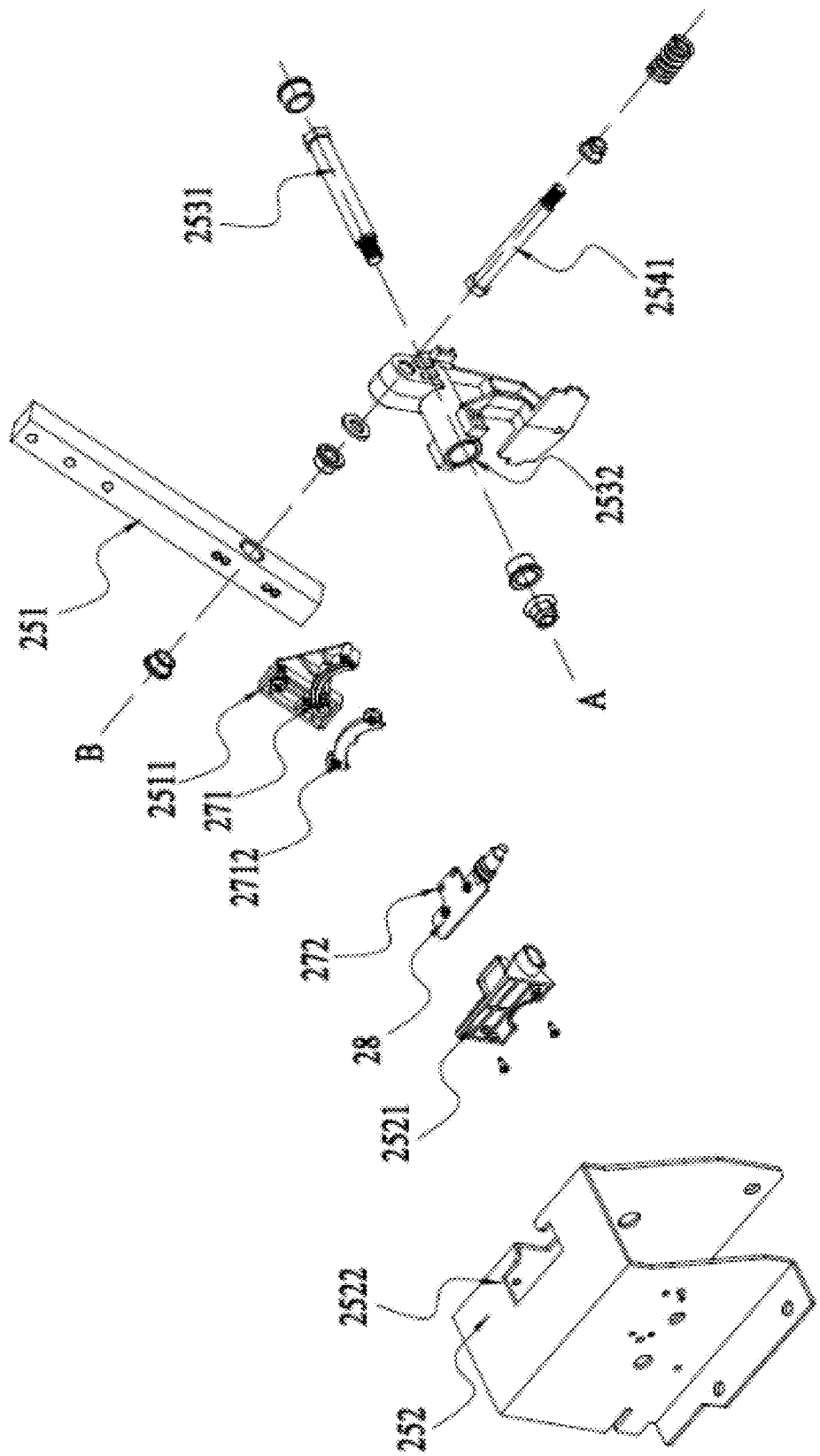
FIG. 16 is an exploded view of the operating apparatus shown in FIG. 14.
Figure 17:
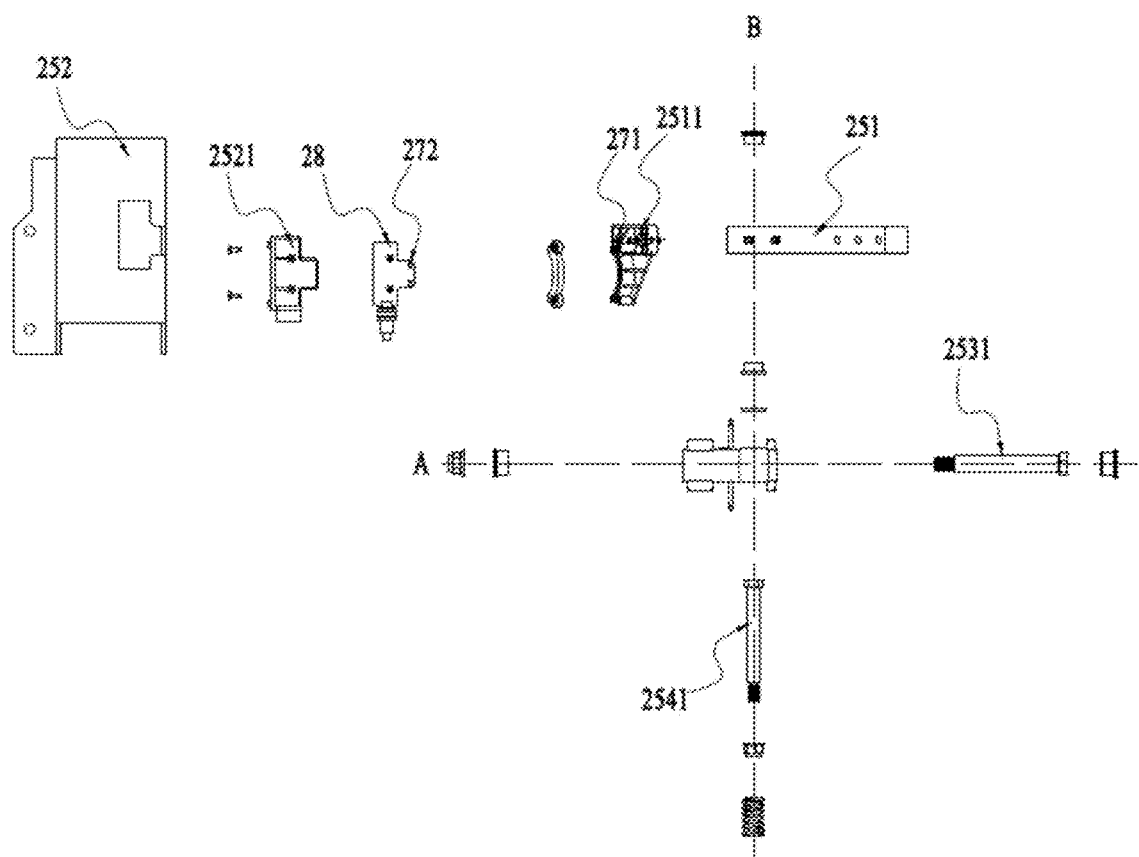
FIG. 17 is an exploded view of the operating apparatus shown in FIG. 14 from another perspective.
Figure 18:
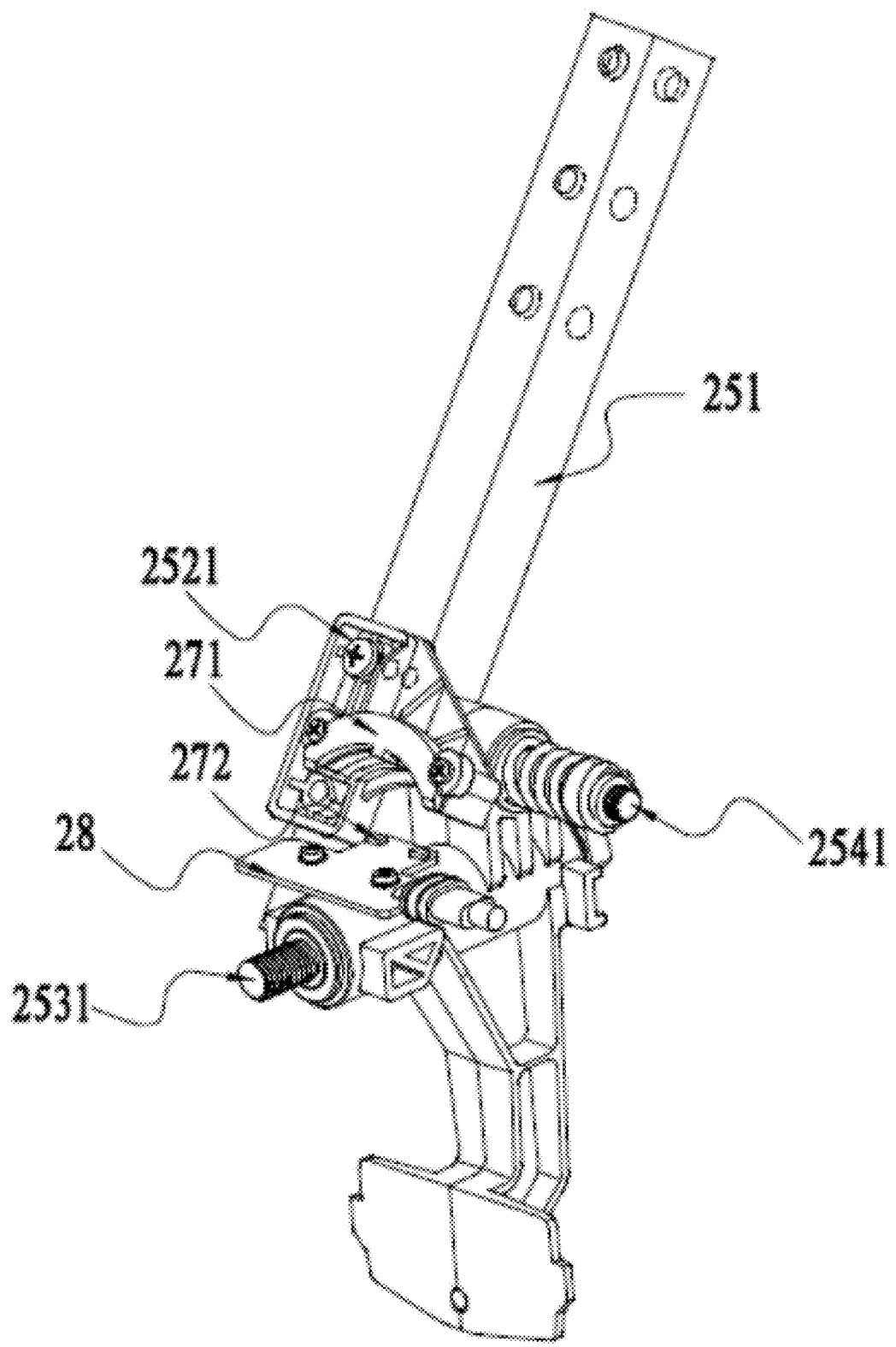
FIG. 18 is a partial structural diagram of the operating apparatus shown in FIG. 14.
Figure 19:
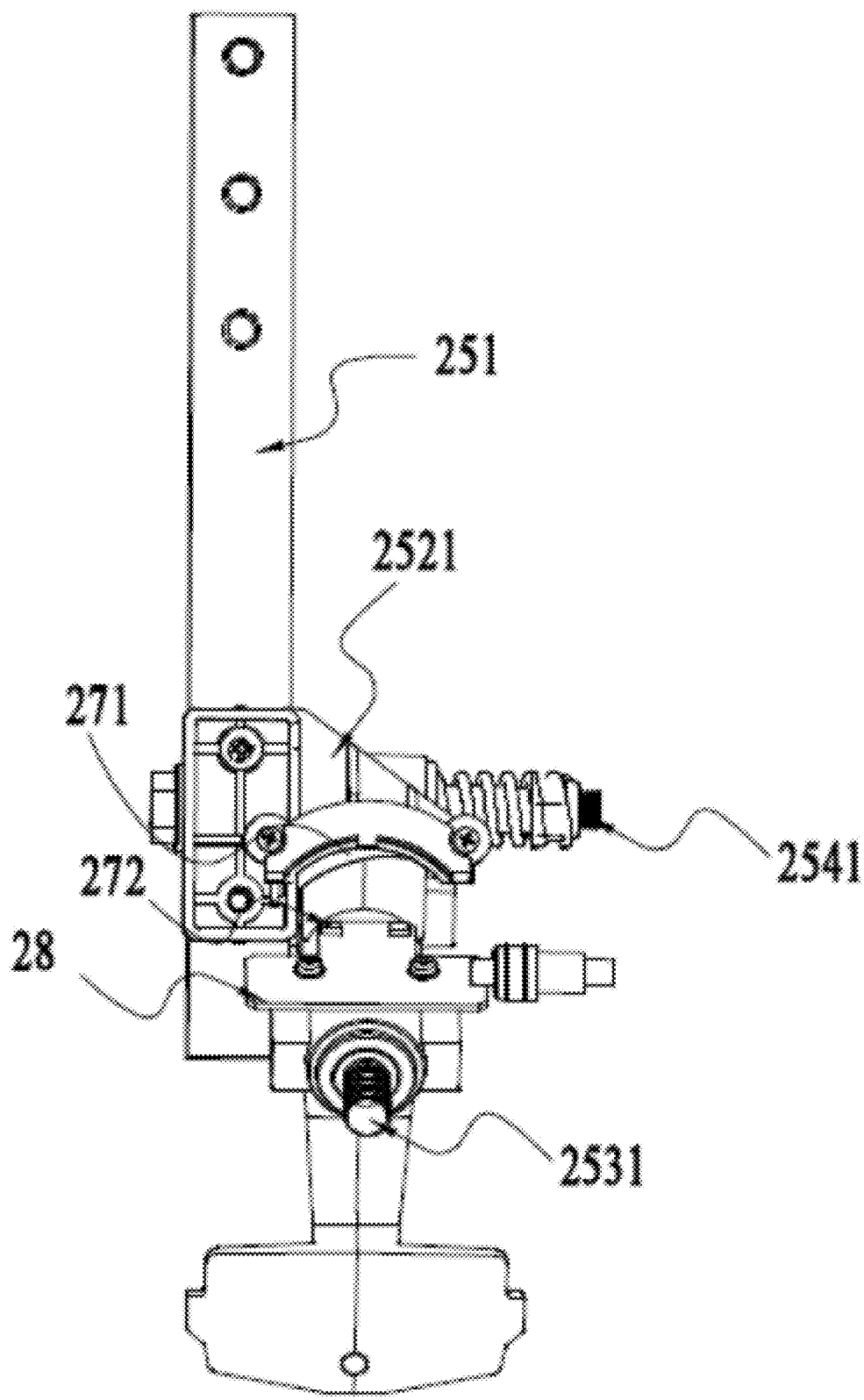
FIG. 19 is a partial structural diagram of the operating apparatus shown in FIG. 14 from another perspective.
Figure 20:
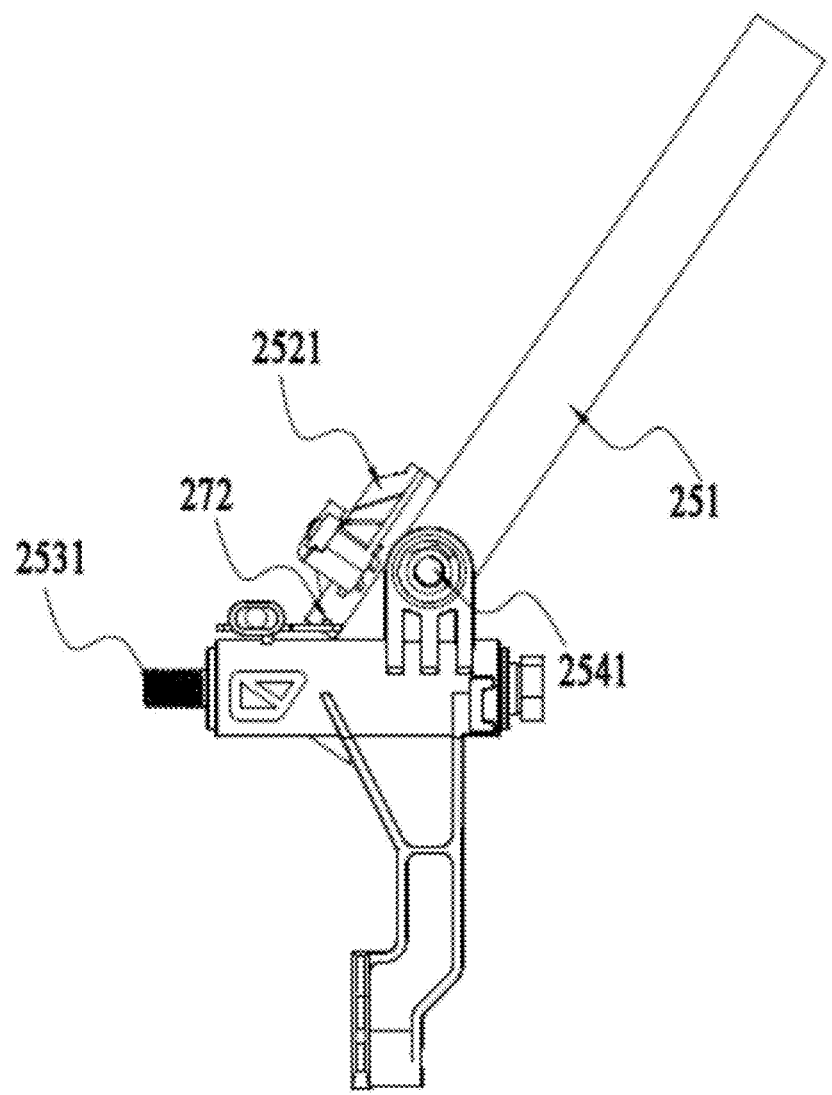
FIG. 20 is a partial structural schematic view of the operating apparatus shown in FIG. 14 from another perspective.
Figure 21:
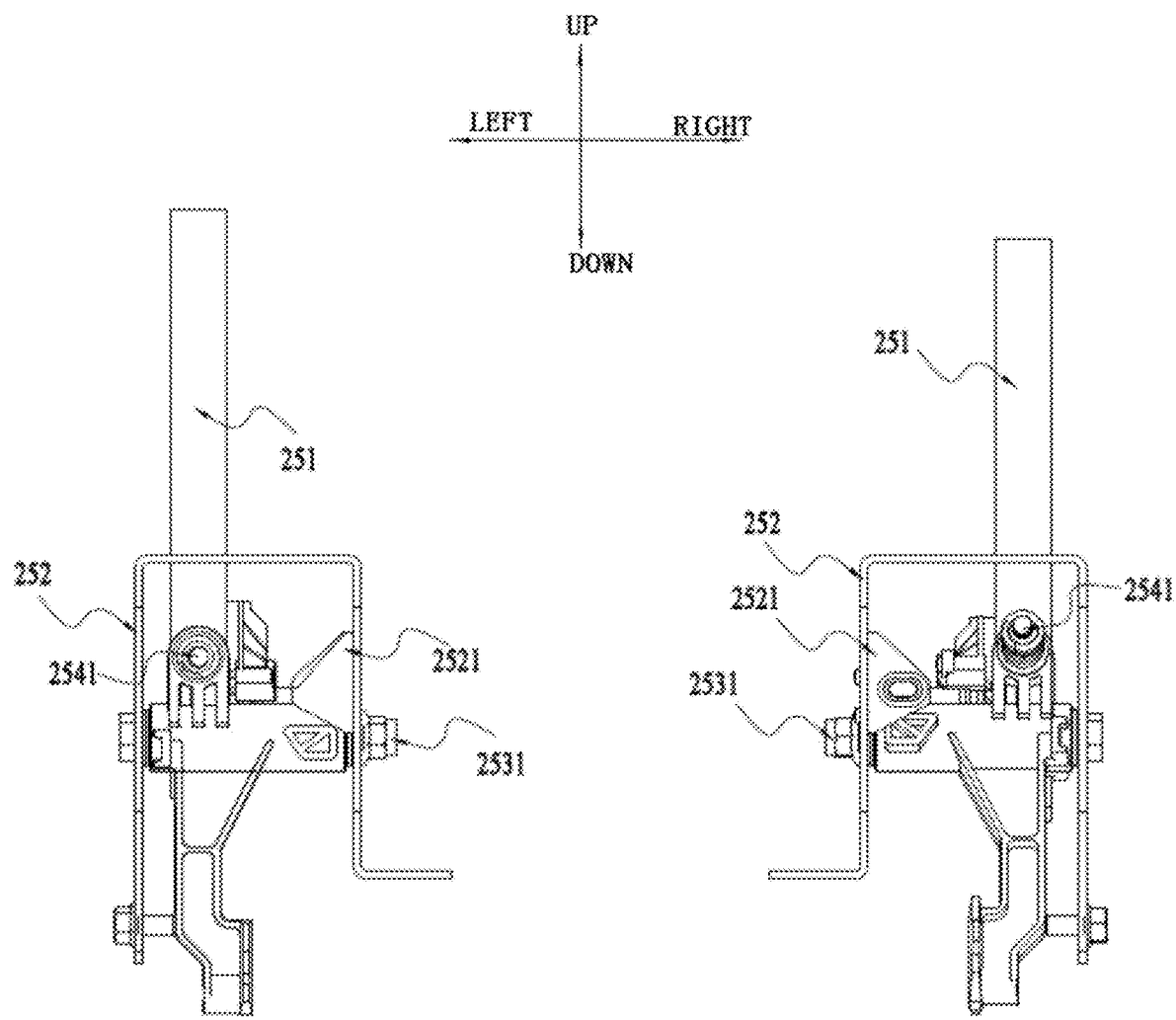
FIG. 21 is a perspective view of the operating apparatus shown in FIG. 14, wherein the operating lap bar is at a position in the first direction.
Figure 22:
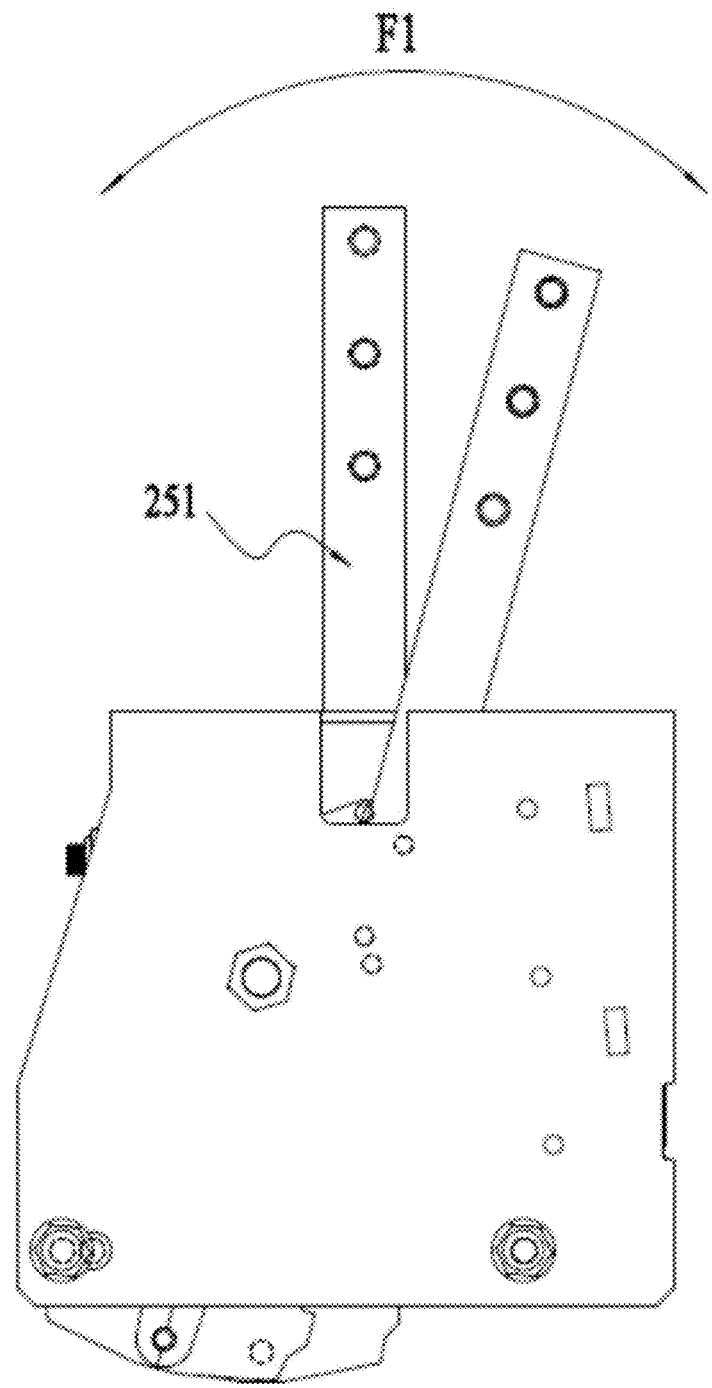
FIG. 22 is a perspective view of the operating apparatus shown in FIG. 21 from another perspective.
Figure 23:
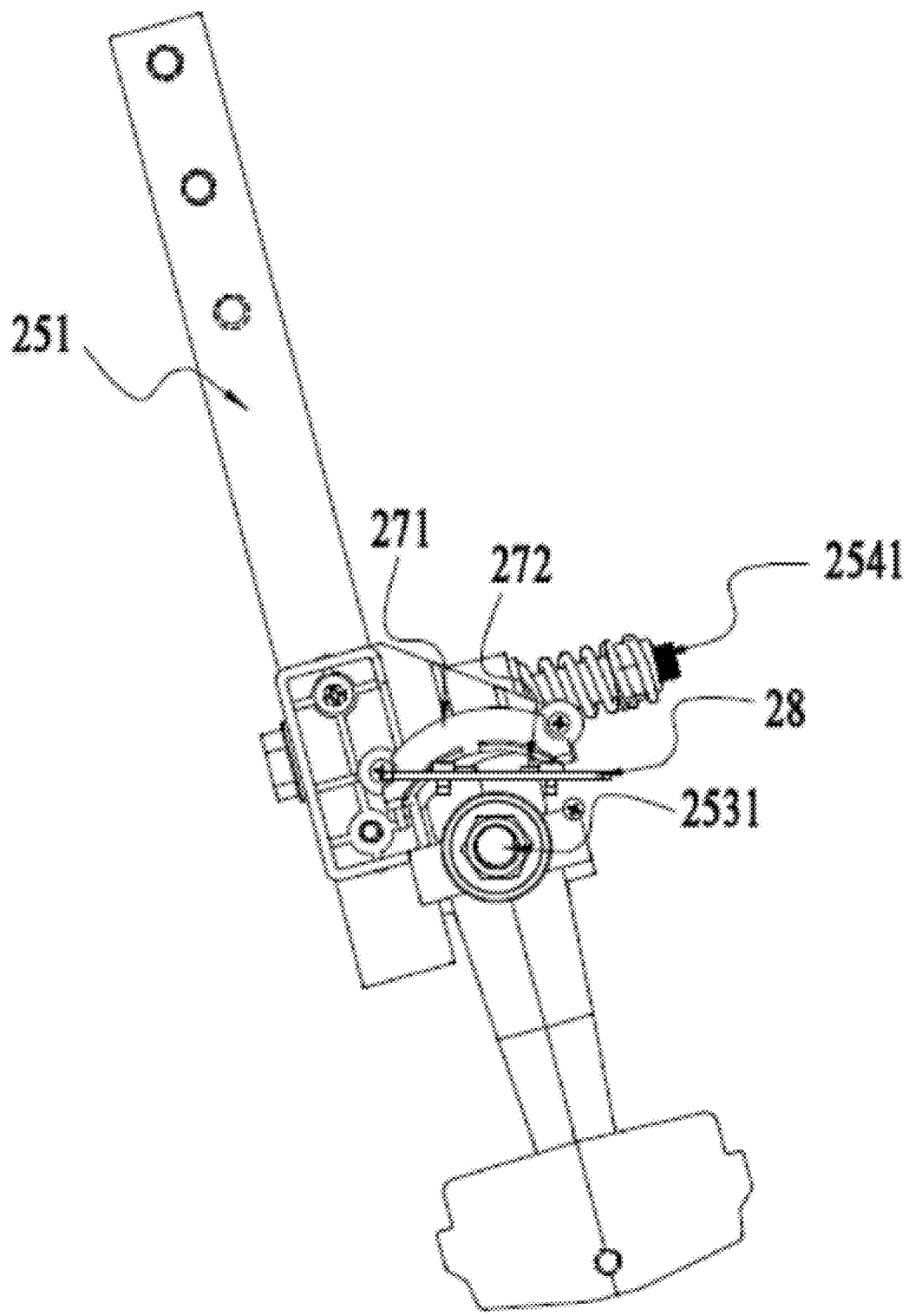
FIG. 23 is a partial structural diagram of the operating apparatus shown in FIG. 21.
Figure 24:
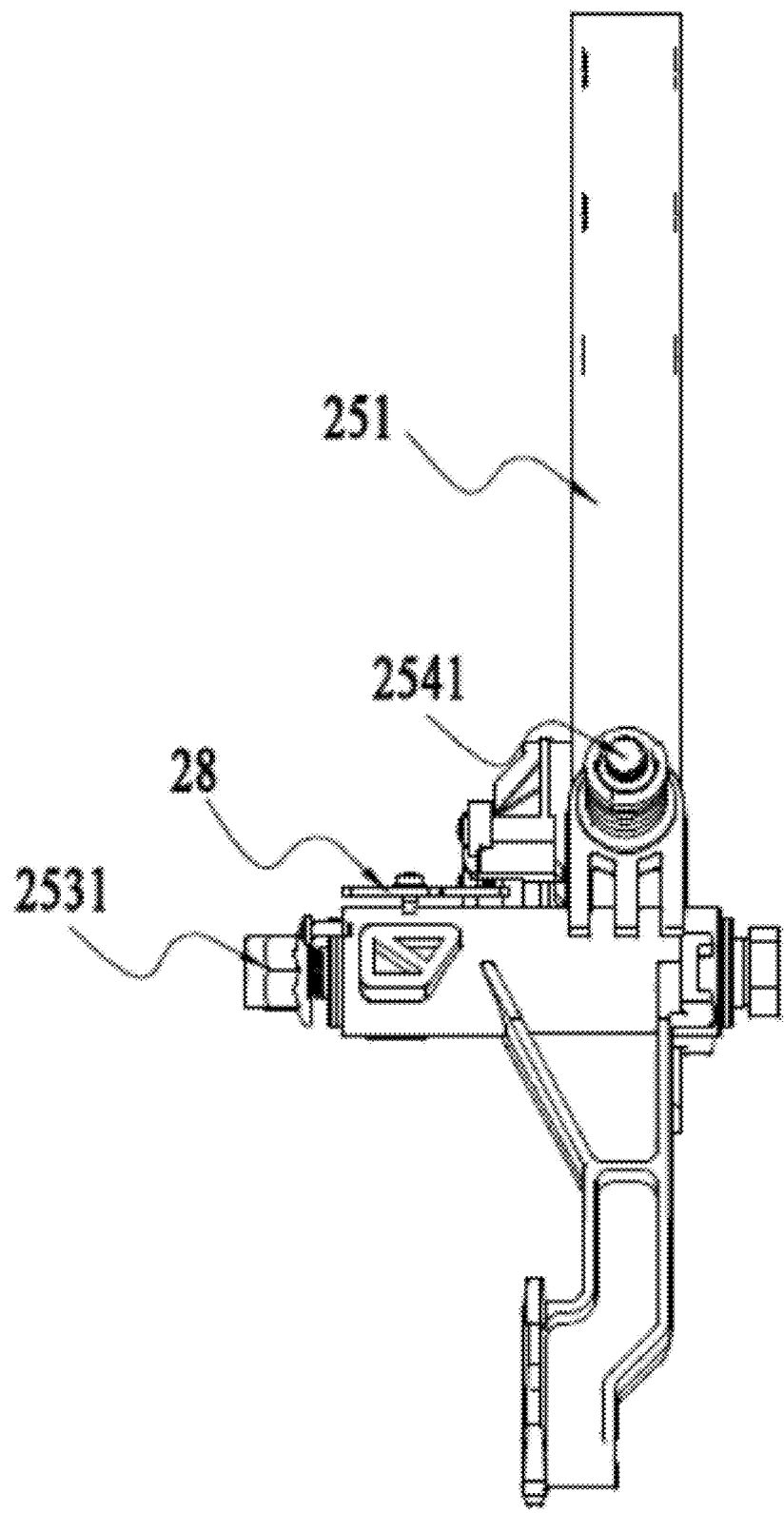
FIG. 24 is a partial structural schematic view of the operating apparatus shown in FIG. 21 from another perspective.

The sensor assembly includes a plurality of high-sensitivity sensing elements 1724, for example, a resistive sensing element, and the multiple sensing elements 1724 form a bridge structure. In the present example, the sensing elements 1724 form two unique push-pull Wheatstone bridge structures, namely a first bridge 1725 and a second bridge 1726, and each Wheatstone bridge structure contains four sensing elements 1724 which are resistive elements with high sensitivity. With this arrangement, when a magnetic element 171 (for example, a magnet) having two magnetic poles is placed on the surface of the chip 1721, the magnetic element 171 can generate a magnetic field in any direction on the surface of the chip 171 by relative rotation. Due to the tunnel magnetoresistance effect, the resistance value of the sensing elements 1724 and the sensor assembly including the sensing elements 1724 changes in a sine-cosine relationship with the angle between the magnetic field directions of the first magnetic layer and the second magnetic layer, so when the magnetic field direction of the magnetic element 171 changes, the output detection signal of the magnetoresistive sensor 172 is a voltage signal that changes in a sine-cosine curve (see FIG. 13), thereby realizing the measurement of the rotation angle of the magnetic field of the magnetic element 171 and detecting the angular position of the operating lap bar 151 in this way.

Adopting TMR sensor as the magnetoresistive sensor 172 and the optimal peak value of the output signal can reach 90% of the operating voltage, thereby omitting the external signal amplification circuit required in many applications. Meanwhile, the error is kept low when the magnetic field changes within 1 KOe, and the unique Wheatstone bridge structure effectively compensates the temperature drift of the sensor.

Figure 12:
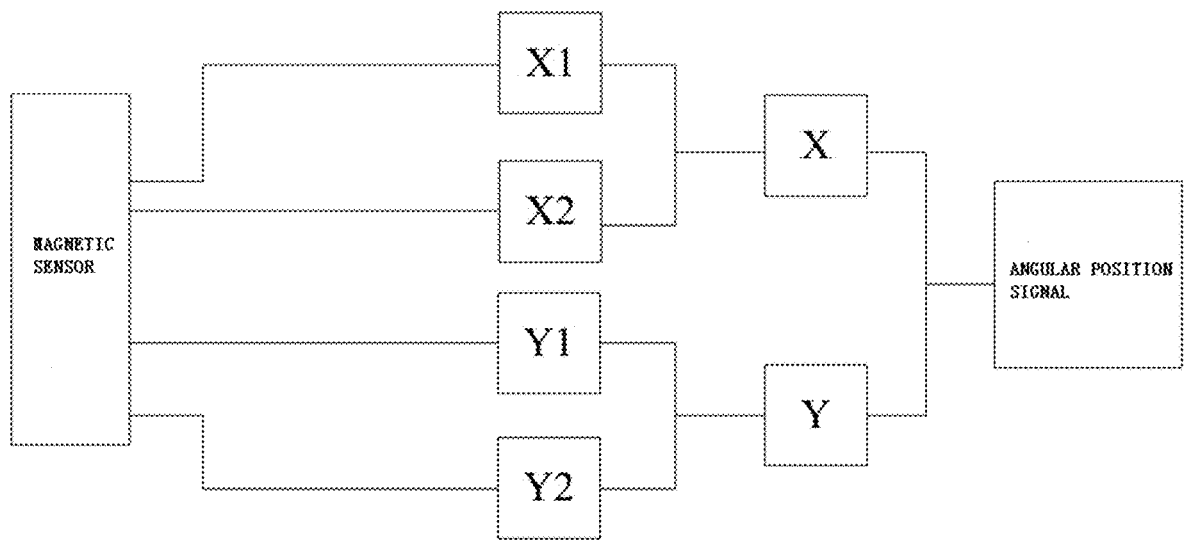
FIG. 12 is a principle diagram of the magnet sensor for measuring the angular position of the operating lap bar.

FIG. 12 is a schematic diagram showing the position detection using the TMR sensor as the magnetoresistive sensor 172. The sensing elements constitute the first bridge 1725 and the second bridge 1726. The first bridge 1725 outputs a first differential signal, and the second bridge 1726 outputs a second differential signal.

The first detection signal includes the first differential signal and the second differential signal or the first detection signal is calculated from the first differential signal and the second differential signal.

Specifically, the first bridge 1725 of the TMR sensor outputs analog signals X1 and X2 in the first direction, and the first bridge 1725 outputs analog signals Y1 and Y2 in the second direction. The first differential signal X=X1−X2 will give the cosine vector of the deflection angle α of the magnetic field direction of the second magnetic layer 1723 relative to the first magnetic layer 1722, i.e., X=|X1−X2|=A Cos α, and the second differential signal Y=|Y1−Y2| will give the sine vector of the deflection angle α of the magnetic field direction of the second magnetic layer 1723 relative to the first magnetic layer 1722, i.e., Y=|Y1−Y2|=A Sin α, then the deflection angle α of the magnetic element 171 relative to the magnetoresistive sensor 172 is:

$$\alpha = \tan^{-1} Y/X.$$

Thus, when the operating lap bar 151 moves in the first direction F1, the first pivoting module is driven to rotate about the first axis A, and the magnetic element 171 which is located in the groove 1545 of the position detecting module mounting portion 1543 on the first pivoting module 154 rotates relative to the magnetoresistive sensor 172. The rotation angle can be obtained by the above formula. In this way, the position of the operating lap bar 151 in the first direction F1 can be obtained, including the forward position, intermediate position and rear position.

The second detection signal includes the first differential signal and the second differential signal or the second detection signal is calculated from the first differential signal and the second differential signal. In some examples, the magnetic element 171 and the magnetoresistive sensor 172 approach each other when the operating lap bar 151 moves from the outboard position to the inboard position, and the magnetoresistive sensor 172 outputs the first signal indicating that the operating lap bar 151 is in the inboard position until the magnetoresistive sensor 172 and the magnetic element 171 are in the approaching position; the magnetic element 171 and the magnetoresistive sensor 172 are away from each other when the operating lap bar 151 moves from the inboard position to the outboard position, and the magnetoresistive sensor 172 outputs the second signal indicating that the operating lap bar 151 is in the away position until the magnetoresistive sensor 172 and the magnetic element 171 are in the away position.

In some examples, when the operating lap bar 151 rotates in the second direction F2 around the second axis B between the inboard position and the outboard position, if the value or the calculated value of the second detection signal output by the magnetoresistive sensor 172 is less than or equal to the second preset threshold, the magnetoresistive sensor 172 outputs the second signal, and the control module determines that the operating lap bar 151 is at the outboard position in the second direction F2; if the value or the calculated value of the second detection signal output by the magnetoresistive sensor 172 is greater than the first preset threshold, the magnetoresistive sensor 172 outputs the first signal, and the control module determines that the operating lap bar 151 is at the inboard position in the second direction F2. In some examples, the first preset threshold is greater than or equal to the second preset threshold.

In some specific examples, the square value of the first differential signal X and the second differential signal Y is compared with a preset threshold to detect or determine that the operating lap bar 151 is at the inboard position or the outboard position in the second direction F2. The first differential signal X=|X1−X2|=A Cos α and the second differential signal Y=|Y1−Y2|=A Sin α output by the TMR sensor. The deflection angle α of the magnetic element 171 relative to the magnetoresistive sensor 172 can be obtained by the arctangent operation of the first differential signal X and the second differential signal Y, and the square operation of the two X2+Y2=A2 can be used to detect the offset distance of the magnetic element 171 relative to the magnetoresistive sensor 172. At this point, the calculated value of the second detection signal is X2+Y2=A2. A relative displacement occurs between the magnetoresistive sensor 172 and the magnetic element 171 when the operating lap bar 151 rotates between the inboard position and the outboard position about the second axis B in the second direction F2, and the distance between the magnetoresistive sensor 172 and the magnetic element 171 will also change, thereby the value of X2+Y2=A2 will also change. Therefore, it is possible to determine whether the operating lap bar 151 is at the inboard position or the outboard position by setting the preset threshold and comparing the second detection signal with the preset threshold.

The preset threshold can be obtained through iterative experiments. When the calculated value A2 of the second detection signal is less than the second preset threshold, that is, the second detection signal is the second signal, the operating lap bar 151 is considered to be at the outboard position in the second direction F2; when the calculated value A2 of the second detection signal is greater than the first preset threshold, the operating lap bar 151 is considered to be at the inboard position in the second direction F2. The first preset threshold is greater than or equal to the second preset threshold.

The opening and closing states of the switch are simulated in the above manner to detect the inboard and outboard positions of the operating lap bar 151 on the second direction F2.

In some other specific examples, the first differential signal X and the second differential signal Y are compared with their respective preset threshold to determine whether there is a magnetic field near the magnetoresistive sensor 172, so as to detect the inboard position and outboard position of the operating lap bar in the second direction F2. According to the principle of the TMR sensor, the TMR sensor tends to the external magnetic field only when there is a magnetic field around it. When there is no magnetic field outside, the first differential signal X=X1−X2 and the second differential signal Y=Y1−Y2 all approaches 0. After experimental determination, the size of X1, X2, Y1, Y2 is in an uncertain state when there is no magnetic field outside. Therefore, whether there is a magnetic field around the magnetoresistive sensor 172 can be determined according to the states of X1, X2, Y1, and Y2. Thus, the presence or absence of a magnetic field in the vicinity of the magnetoresistive sensor 172 can be compared and judged by setting the respective threshold values of the first differential signal X and the second differential signal Y.

Specifically, when the operating lap bar 151 moves from the inboard position to the outboard position in the second direction F2, the second pivoting module 155 is driven to rotate about the second axis B, and the lower portion of the operating lap bar 151 pushes the mounting shaft 157 to move inward, thereby driving the magnetoresistive sensor 172 on the mounting shaft 157 to move away from the magnetic element 171. And determining the operating lap bar 151 is at the outboard position until the absolute values of the detected first differential signal and second differential signal are less than the second preset threshold. Similarly, when the operating lap bar 151 moves from the outboard position to the inboard position in the second direction F2, determining the operating lap bar 151 is at the inboard position until the absolute values of the detected first differential signal and second differential signal are both greater than the second preset threshold.

In some specific examples, the threshold values of the first differential signal X and the second differential signal Y are 0.2V, which is $$X=|X1-X2|\le 0.2V;$$

$$Y=|Y1-Y2|\le 0.2V;$$

When satisfied at the same time, it can be judged that there is no magnetic field around it, so the first preset threshold can be set to 0.2V and the second preset threshold can be set to 0.2V. Of course, the values of the first preset threshold and the second preset threshold may also be other values by choosing according to actual needs. It should be noted that the first preset threshold may be equal to the second preset threshold or greater than the second preset threshold.

In the above manner, only one position detecting module 17 can detect the position of the operating lap bar 151 in the first direction F1 and the second direction F2, which not only saves the cost of parts, but also makes the structure design of the operating apparatus simple, and the position detecting module is easy to install and disassemble; in addition, the position detection using the TMR magnetic sensor makes the detection result reliable.

The first detection signal output by the magnetoresistive sensor 172 is transmitted to the control module. The control module determines the target position of the operating lap bar 151 in the first direction F1 according to the detection result, and then obtaining the target speed or target state of the second motor and the target state of the riding lawn-mower 100 according to the relationship between the target position of the operating lap bar 151 and the target speed or target state of the second motor or lookup table, and control the second motor to reach the set target speed or target state, so that achieve the purpose of controlling the second motor by the operating lap bar. The second detection signal output by the magnetoresistive sensor 172 is transmitted to the control module. The control module determines whether the operating lap bar 151 is at the inboard position or the outboard position according to the detection result, and then obtaining the target state (working state or non-working state) of the riding lawn mower 100 according to the corresponding relationship between the target position of the operating lap bar 151 and the working state and non-working state of the riding lawn mower 100, and control the riding lawn mower 100 to enter the working state or non-working state, so that the operating lap bar can control the riding lawnmower 100 to enter the working state or non-working state.

The solution of the first example described above uses one position detecting module 17 to simultaneously detect the position of the operating lap bar 151 in two directions. However, in some cases, the position detecting module 17 may only detect the position of the operating lap bar 151 in one of the directions, for example, only detect the inboard position and the outboard position of the operating lap bar 151 in the second direction F2. In this case, the operating lap bar 151 of the riding lawnmower 100 is configured to be movable in only one direction, and may be movable in both directions.

Therefore, in the second example of the present disclosure, the operating lap bar 151 of the riding lawn mower 100 is configured to be movable in two directions, but the position detecting module 17 is only used to detect the inboard position and the outboard position of the operating lap bar 151 in the second direction F2.

In this example, the operating apparatus 15 of the riding lawn mower 100 is the same as the operating apparatus 15 in the first example, except that the position detecting module 17 only detects that the inboard position and the outboard position of the operating lap bar 151 in the second direction F2.

The operating apparatus 15 of the riding lawn mower 100 includes: at least one bracket that can be mounted on the riding lawn mower 100; an operating lap bar assembly, including an operating lap bar 151 configured to rotate between the inboard position and the outboard position; a pivoting assembly, including a pivot shaft, for pivotally mounting the operating lap bar 151 on the bracket, so that the operating lap bar 151 rotates between the inboard position and the outboard position about the pivot shaft.

The operating apparatus 15 includes a position detecting module 17 which includes a magnetic element 171 and a magnetoresistive sensor 172. The magnetic element 171 is disposed on the pivoting assembly or the bracket, and the magnetoresistive sensor 172 is spaced apart from the magnetic element 171. In this way, when the operating lap bar 151 rotates about the second axis in the second direction, the operating lap bar 151 can drive the magnetic element 171 and the magnetoresistive sensor 172 to produce relative displacement or rotation, so as to detect the inboard position and outboard position of the operating lap bar 151.

In other words, the arrangement of the magnetic element 171 and the magnetoresistive sensor 172 can enable the magnetic element 171 and the magnetoresistive sensor 172 to move or rotate relative to each other when the operating lap bar 151 rotates. The following are several implementations of the arrangement of the magnetic element 171 and the magnetoresistive sensor 172:

Example 1

The magnetic element 171 is fixedly connected to the bracket to prevent the magnetic element 171 from moving, and the magnetoresistive sensor 172 is connected in association with the pivoting assembly to enable the magnetoresistive sensor 172 to move when the operating lap bar 151 rotates. In this way, when the operating lap bar 151 rotates between the inboard position and the outboard position about the pivot shaft of the pivoting assembly, the magnetoresistive sensor 172 is driven to move, so that a relative displacement occurs between the magnetic element 171 and the magnetoresistive sensor 172, and the magnetoresistive sensor 172 outputs a detection signal related to the inboard position and outboard position of the operating lap bar 151.

Example 2

The magnetoresistive sensor 172 is fixedly connected to the bracket to prevent the magnetic element 171 from moving, and the magnetic element 171 is connected in association with the pivoting assembly to enable the magnetic element 171 to move when the operating lap bar 151 rotates. In this way, when the operating lap bar 151 rotates between the inboard position and the outboard position about the pivot shaft of the pivoting assembly, the magnetic element 171 is driven to move, so that a relative displacement occurs between the magnetic element 171 and the magnetoresistive sensor 172, and the magnetoresistive sensor 172 outputs a detection signal related to the inboard position and outboard position of the operating lap bar 151.

Example 3

The magnetoresistive sensor 172 and the magnetic element 171 are connected in association with the pivoting assembly to enable the magnetoresistive sensor 172 and the magnetic element 171 to produce relative movement. In this way, when the operating lap bar 151 rotates between the inboard position and the outboard position about the pivot shaft of the pivoting assembly, the magnetic element 171 and the reluctance sensor 172 are driven to produce relative displacement, and the magnetoresistive sensor 172 outputs a detection signal related to the inboard position and outboard position of the operating lap bar 151.

The above-mentioned several examples and other structural designs that can satisfy the the relative movement and relative rotation of the magnetic element 171 and the magnetoresistive sensor 172 when the operating lap bar 151 rotates fall within the protection scope of the present disclosure.

In this way, the position detecting module 17 using the magnetoresistive effect is used to detect the position of the operating lap bar 151 when the operating lap bar 151 rotates between the inboard position and the outboard position about the pivot shaft, so that the structure design is simple and the test result is reliable.

Referring to FIGS. 14 to 29, as another example of the operating apparatus 25, the magnetic sensor is a Hall sensor. The operating apparatus 25 includes: at least one bracket 252 that can be mounted on the riding lawn mower 100. Specifically, the bracket 252 is fixedly installed on the chassis 11; an operating lap bar assembly, including an operating lap bar 251 configured to rotate between a forward position, an intermediate position, a rear position about the first axis A in the first direction F1, and to rotate between an inboard position and an outboard position about the second axis B in the second direction F2; and a pivoting assembly is for arranging the operating lap bar on the bracket 252 pivotally so that the operating lap bar 151 rotates about the first axis A in the first direction F1 and the second axis B in the second direction F2. It should be noted that in this example, for an user sitting on the seat 12, the second axis B and the first direction F1 extend in the front-rear direction, and the first axis A and the second direction F2 extend in the left-right direction.

As another example of the position detecting module 27 of the riding lawn mower 100, the position detecting module 27 includes a magnetic element 271 and a Hall sensor 272. The magnetic element 271 or the Hall sensor 272 is connected in association with the operating lap bar 251 or the pivoting assembly. The Hall sensor 272 and the magnetic element 271 are spaced apart so that when the operating lap bar 251 rotates around the first axis A in the first direction F1, a relative rotation occurs between the Hall sensor 272 and the magnetic element 271 to detect the forward position, intermediate position and rear position of the operating lap bar 251 in the first direction F1; and when the operating lap bar 251 rotates around the second axis B in the second direction F2, the magnetic element 271 and the Hall sensor 272 can be driven to produce a relative displacement to detect the inboard position and outboard position of the operating lap bar 251 in the second direction F2.

Referring to FIGS. 16 to 19, the magnetic element 271 of the position detecting module 27 is associated with the operating lap bar 251, and the magnetic element 271 can follow the movement of the operating lap bar 251. The Hall sensor 272 is fixedly mounted on the bracket 252. The magnetic element 271 and the Hall sensor 272 can move relative to each other when the operating lap bar 251 rotates about the first axis A in the first direction F1, and the Hall sensor 272 outputs a first detection signal related to the position of the operating lap bar 251 in the first direction F1. And when the operating lap bar 251 rotates around the second axis B in the second direction F2, the magnetic element 271 and the Hall sensor 272 can produce relative motion, and the Hall sensor 272 can output a second detection signal related to the position of the operating lap bar 251 in the second direction F2.

The magnetic element 271 is mounted on the operating lap bar 251. Specifically, the operating lap bar 251 is provided with a first mounting portion 2511 which is for mounting the magnetic element 271 to fix the magnetic element and the operating lap bar together so that it can move synchronously with the operating lap bar 251. The first mounting portion 2511 and the operating lap bar 251 are integrally formed or fixedly installed.

The Hall sensor 272 is fixedly mounted on the bracket 252. Specifically, the bracket 2521 is provided with a second mounting portion 2521 which is integrally formed or fixedly mounted with the operating lap bar 251. The second mounting portion 2521 is used for installing the Hall sensor. The second mounting portion 2521 is also used to mount the PCB board 28. The Hall sensor 272 is arranged on the PCB board 28. In order to enable the Hall sensor 272 to be firmly fixed on the PCB board 28, the Hall sensor 272 is sealed on the PCB board 28 with glue.

The positions of the first mounting portion 2511 and the second mounting portion 2521 are set correspondingly, so that the Hall sensor 272 can output a detection signal that meets the requirements, and the detection signal is related to the position of the operating lap bar 251 in the first direction F1 and the position in the second direction F2.

The operating lap bar assembly includes an operating lap bar 251 and a pivoting assembly. The other structural composition of the operating lap bar 251 is similar to the structural composition of the operating lap bar 151 in the operating device 15 in the foregoing example, which will not be repeated here.

The pivoting assembly includes a first pivoting module 253 and a second pivoting module 254. Wherein, the first pivoting module 253 is installed on the bracket 251, and the second pivoting module 254 is installed on the first pivoting module 253.

The first pivoting module 253 includes a first pivot shaft 2531 which is fixedly mounted on the first bracket 252, and the first pivot shaft 2531 defines a first axis A. In some examples, the first pivoting module 253 further includes a shaft sleeve 2532. The shaft sleeve 2532 partially surrounds the first pivot 2531 and is rotatable about the first pivot shaft 2531. The first pivoting module 253 allows the operating lap bar 251 to rotate about the first axis A in the first direction F1, and the first axis A is the axis of the first pivot shaft 2531.

The second pivoting module 254 includes a second pivot shaft 2541 which is fixedly mounted on the first pivoting module 253, and the second pivot shaft 2541 defines a second axis B. Specifically, the second pivot shaft 2541 of the second pivoting module 254 is fixedly installed in the mounting hole provided on the shaft sleeve 2532 of the first pivoting module 253. The operating lap bar 151 is pivotally mounted on the second pivot shaft 2541 and can rotate around the second pivot shaft 2541. The operation lap bar 151 is provided with a perforation through which the second pivot shaft 2541 passes, and the operation lap bar 251 can rotate around the second pivot shaft 2541. The second pivoting module 254 allows the operating lap bar 251 to rotate about the second axis B in the second direction F2, and the second axis B is the axis of the second pivot shaft 2541.

The position of the operating lap bar 251 in the first direction F1 and in the second direction F2 are the target speed or target state of the corresponding second motor set by the user and the target state of the riding lawnmower 100 (working state or non-working state). The position in the first direction F1 and the position in the second direction F2 may include a plurality of different positions in various directions.

The position in the first direction F1 includes a forward position, a intermediate position, and a rear position, respectively corresponding to the forward, zero-speed, and backward states of the riding lawn mower 100. The position in the second direction F2 includes a inboard position and a second inboard position, respectively corresponding to the working state (that is, the ready state or the zero-speed state) and the non-working state (that is, the parking state).

Among them, the operating lap bar 251 provides multiple target traveling speeds in the forward direction between the forward position and the intermediate position, and the operating lap bar 251 provides multiple target traveling speeds in the reverse direction between the intermediate position and the rear position; The inboard position of the operating lap bar 251 in the second direction F2 coincides with the intermediate position of the operating lap bar 251 in the first direction F1, and the user can apply power to the riding lawnmower 100 when the operating lap bar in the outboard position.

When the operating lap bar 251 rotates between the forward position, the intermediate position, and the rear position about the first axis A in the first direction F1, the first pivoting module 253 is driven to rotate about the first axis A in the first direction F1. When the operating lap bar 251 rotates between the inboard position and the outboard position about the second axis B in the second direction F2, the second pivoting module 254 is driven to rotate about the second axis B in the second direction F2.

The position detecting module 17 is at least partially associated with the bracket 252 and/or pivoting assembly or operating lap bar 251 for detecting the position of the operating lap bar 151 in the first direction F1, including the forward position, the intermediate position, and the rear position, and the position of the operating lap bar 151 in the second direction F2, including the inboard position and the outboard position. For example, when the operating lap bar 151 is at the forward position, the corresponding target state of the second motor is the maximum forward speed; when the operating lap bar 151 is at the rear position, the corresponding target state of the second motor is the maximum reverse speed; when the operating lap bar 151 is at the intermediate position, the corresponding target state of the second motor is the zero-speed state; when the operating lap bar 151 is at the inboard position, the corresponding state of the riding lawn mower is in the ready-to-work state (that is, the ready state), in some specific examples, the inboard position is close to or coincides with the intermediate position, thus the corresponding state of the second motor is the zero-speed state; when the operating lap bar 151 is at the outboard position, the corresponding state of the riding lawn mower is to exit work (non-working) state. The user sets the corresponding target speed or target state of the second motor by moving the operating lap bar 151, and controls the operation of the second motor, so that the target speed or target state of the corresponding second motor is also from the target rotation speed or target state which is controlled by the position of the operating lap bar 151 set by the user.

The position detecting module 27 is electrically connected to the control module. In this example, the Hall sensor 272 which is in the position detecting module 27 is electrically connected to the control module.

The Hall sensor 272 outputs a detection signal to the control module. The control module obtains the position of the operating lap bar 251 by means of table look-up or calculation according to the signal of the Hall sensor 272, and then obtains the target speed or target state of the second motor corresponding to the current position of the operating lap bar 251 and the target speed or target state of the second walking wheel corresponding to the second motor, and then outputs a control signal to the corresponding second motor or other electronic components of the riding lawnmower 100, so that the riding lawn mower 100 is running in the target state set by the user through the operating lap bar 151. In this way, the target state of the second motor is set according to the positions of the operating lap bar 151 in two directions, respectively, so as to reach the target state set by the operating lap bar 151, thereby realizing the state of forward, backward, stop, turn, park and prepare, etc. of the riding lawnmower 100.

In this example, the magnetic element 271 and the Hall sensor 272 are provided in association, so that when the operating lap bar 251 rotates about the first axis A in the first direction F1, the operating lap bar 251 can drive the magnetic element 271 and the Hall sensor 272 to rotate relative to each other, and then the Hall sensor 272 outputs a first detection signal related to the forward position, the intermediate position, and the rear position of the operating lap bar 251 in the first direction F1; when the operating lap bar 251 rotates about the second axis B in the second direction F2, the operating lap bar 251 can drive the magnetic element 271 and the Hall sensor 272 to move relative to each other, and then the Hall sensor 272 outputs a second detection signal related to the inboard position, and the rear position of the operating lap bar 251 in the second direction F2. The first detection signal and the second detection signal are output to the controllable module 35 (FIG. 33), and the control module (FIG. 33) determines the position of the operating lap bar 251 according to the first detection signal and the second detection signal, and outputs a control signal accordingly to control the riding lawn mower 100 to reach the target speed or target state set by the user through the operation lap bar 251.

The first detection signal contains the position information of the operating lap bar 251. In this way, the position of the operating lap bar 252 in the first direction F1 is detected, including the forward position, the intermediate position, and the rear position.

The second detection signal includes a first signal and a first away signal. Specifically, the magnetic element 271 and the Hall sensor 272 approach each other when the operating lap bar 251 moves from the outboard position to the inboard position, and the control module determines that the operating lap bar 251 is at the inboard position until the Hall sensor 272 outputs the first signal; the magnetic element 271 and the Hall sensor 272 move away from each other when the operating lap bar 251 moves from the inboard position to the outboard position, and the control module determines that the operation lap bar 251 is at the outboard position until the Hall sensor 272 outputs the second signal.

The value or calculated value of the first signal is greater than the first preset threshold, and the value or calculated value of the second signal is less than the second preset threshold. In some examples, the first preset threshold is greater than or equal to the second preset threshold.

In the above manner, the position detecting module 27 is associated with the position of the operating lap bar 251 in the first direction F1 and the second direction F2, so that the position detecting module 27 detects the position of the operating lap bar 251 and sends the detection signal to the control module to control the corresponding second motor to reach the target state or target speed set by the operating lap bar 151.

Specifically, when the user uses the operating apparatus 25 to rotate the operating lap bar 251 about the first axis A in the first direction F1, the operating lap bar 251 drives the first pivoting module 253 to rotate about the first axis A, thereby driving the magnetic element 271 located on the operating 251 to rotate. Since the Hall sensor 272 is disposed on the bracket 252 and cannot move, and when the magnetic element 271 and the Hall sensor 272 move relative to each other, the Hall sensor 272 outputs the first detection signal. The first detection signal includes information on the rotation angle of the magnetic element 271 and the operating lap bar 151, that is, information on the position of the operating lap bar 251 in the first direction F1.

On the other hand, when the user operates the operating lap bar 251 to move the operating lap bar 251 from the inboard position to the outboard position in the second direction F2 or moves the operating lap bar 251 from the outboard position to the inboard position in the second direction F2, the operating lap bar drives the second pivoting module 254 to rotate about the second axis B, thereby driving the Hall sensor 272 mounted on the operating lap bar 251 to move. Since the Hall sensor 272 is disposed on the bracket 252 and cannot move, and when the Hall sensor 272 approaches or moves away from the magnetic element 271, the Hall sensor 272 outputs the second detection signal. The position information of the Hall sensor 272 close to or away from the magnetic element 271, that is, includes the position information of the operating lap bar 251 in the second direction F2.

Of course, those skilled in the art can understand that the mounting positions of the magnetic element 271 and the hall sensor 272 of the position detecting module 27 are not limited to the above manner, as long as the magnetic element 271 and The Hall sensor 272 of the position detecting module 27 are arranged at intervals and in association, so that the magnetic element 271 and the Hall sensor 272 are associated with the position of the operating lap bar 251 in the first direction and in the second direction, so that a relative movement occurs between the magnetic element 271 and the Hall sensor 272 when the operating lap bar 151 rotates, which falls within the protection scope of the present disclosure.

The operating apparatus 25 of FIGS. 14 to 20 is a state diagram when the operating lap bar 251 is at a certain position in the second direction F2. The operation apparatus 25 of FIGS. 21 to 24 is a state diagram when the operating lap bar 251 is at a certain position in the first direction F1.

In some examples, the operation apparatus 25 further includes a guide device 256 for guiding and/or defining the position of the operating lap bar 251. The structure of the guide device 256 is similar to the guide device 152 described in the above example. The guide device 256 has a T-shaped groove, and the operating lap bar 151 can pass through the T-shaped groove and can move within the T-shaped groove.

In this example, the hall effect is used for location detection. The number of Hall sensors can be one or multiple. During the detection process, the vibration caused by the walking of the riding lawn mower 100 and the operation of the operating lap bar causes the operating lap bar to shake, and due to the manufacturing process, the T-shaped groove and the operating lap bar 251 cannot be completely fitted. Therefore, when the operating lap bar moves, a Hall sensor 272 cannot distinguish between the movement of the operating lap bar 251 caused by shaking or the movement of the operating lap bar 251 caused by user operation.

Figure 26:
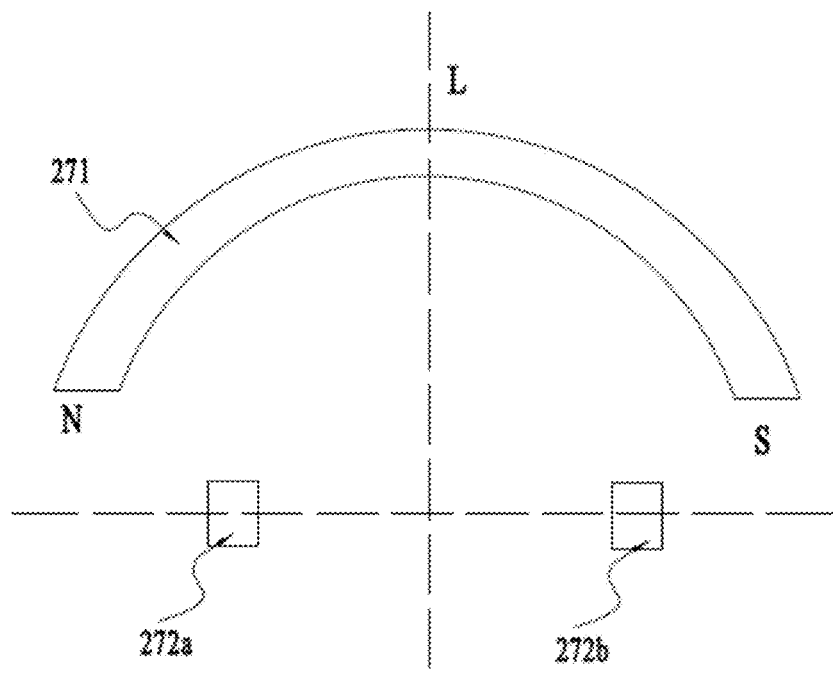
FIG. 26 is a schematic diagram of the location arrangement of the Hall sensor and the magnetic element.
Figure 27:
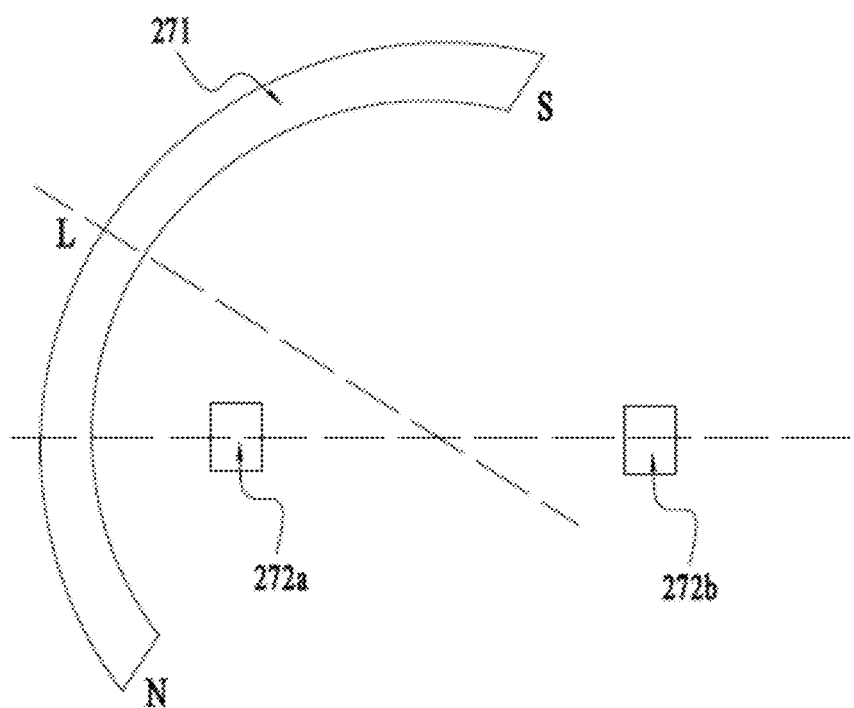
FIG. 27 is a schematic diagram of the positional relationship between the Hall sensor and the magnetic element when the operating lap bar is in one of the positions when it moves in the first direction.
Figure 28:
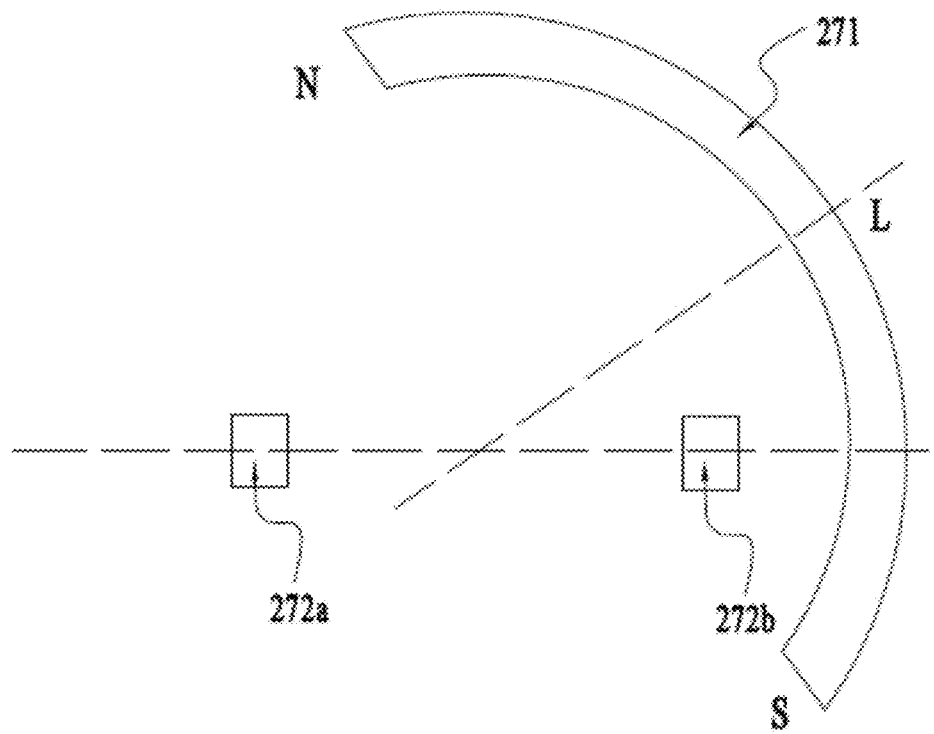
FIG. 28 is a schematic diagram of the positional relationship between the Hall sensor and the magnetic element when the operating lap bar is moved to another position in the first direction.
Figure 29:
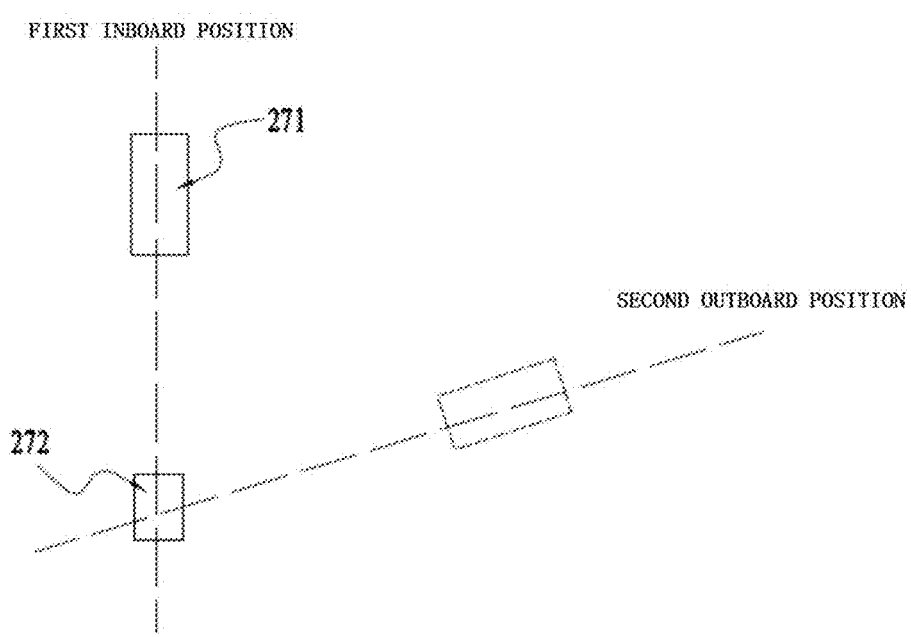
FIG. 29 is a schematic diagram of the positional relationship between the Hall sensor and the magnetic element when the operating lap bar moves in the second direction from the inboard position to the outboard position.

Therefore, in the present example, two Hall sensors 272 are employed. A first Hall sensor 272a and a second Hall sensor 272b which are provided at different positions on the substrate or the PCB board. As a specific example, the first Hall sensor 272a and the second Hall sensor 272b may be arranged symmetrically about the center line of the magnetic element (FIG. 26). In some other examples of the present disclosure, multiple Hall sensors may be used and located at different positions on the substrate or PCB board to detect the position of the operating lap bar in the first direction and in the second direction.

The Hall sensor is specifically a linear Hall sensor, which is composed of a Hall element, a differential amplifier and an emitter follower. The input is the magnetic induction intensity, and the output is a voltage proportional to the input. The circuit of the linear Hall sensor has high sensitivity and excellent linearity. The magnetic element 271 is specifically a magnet having an N pole and an S pole.

Figure 25:
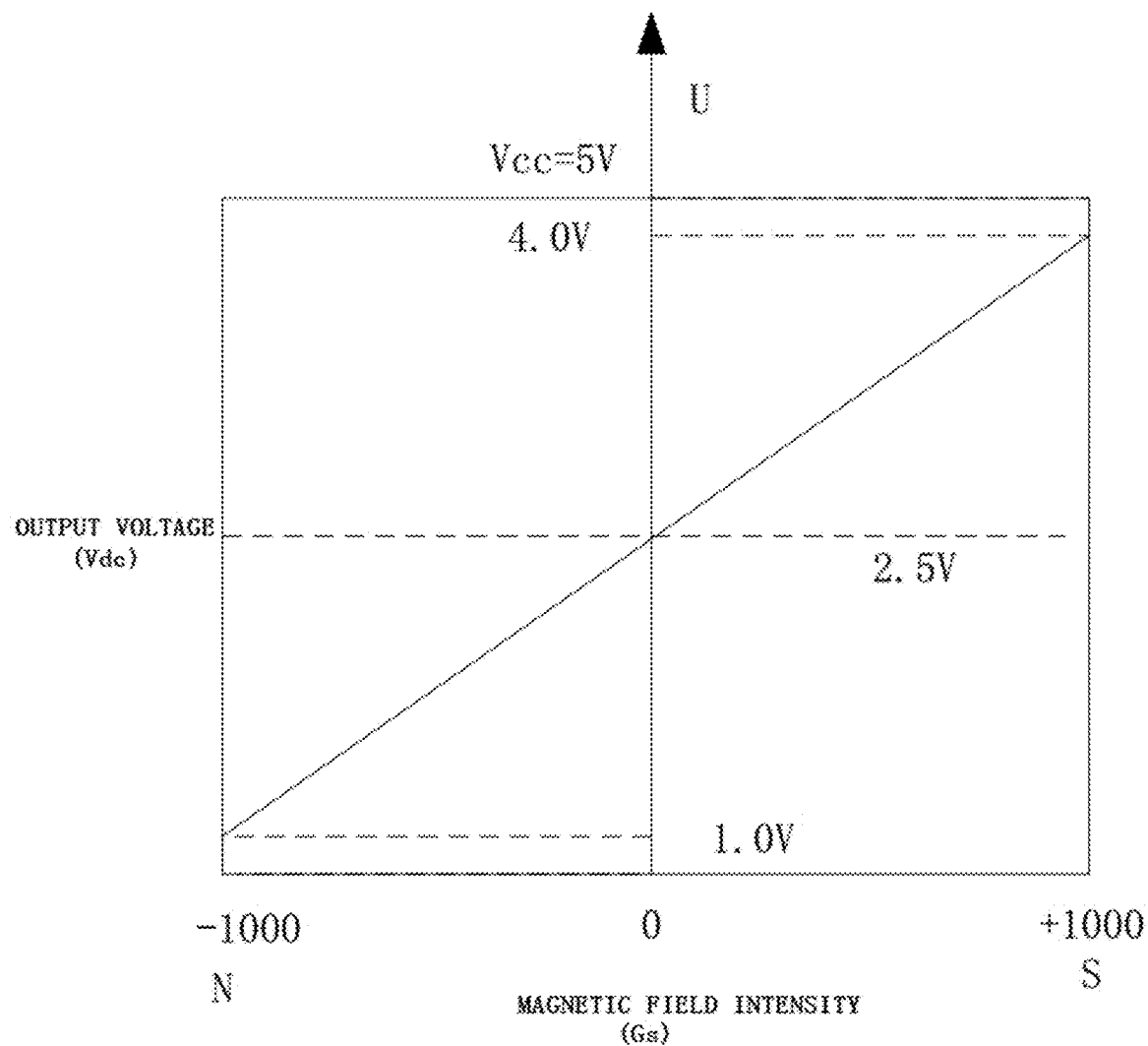
FIG. 25 is a graph of the relationship between the output voltage of the Hall sensor and the magnetic field intensity.

Referring to FIG. 25, as an example of the linear Hall sensor, and the magnetic field strength range is linear with the output voltage range. When the Hall sensor outputs a maximum voltage of 4V, the Hall sensor is at the position where the magnetic field intensity of the magnet S pole is the largest, and when the Hall sensor outputs the minimum voltage of 1V, the Hall sensor is at the position where the magnetic field intensity of the magnet N pole is the largest. When the Hall sensor output voltage is 2.5V, the Hall sensor is at a position where the magnetic field intensity is zero.

Therefore, by fixing the operating lap bar 251 and the magnetic element 271 together, the position of the operating lap bar 251 in the first direction F1 and the second direction F2 can be detected using the change in the relative positional relationship between the Hall sensor 272 and the magnetic element 271, and the position of the operating lap bar 251 in the first direction F1 and the second direction F2 can be determined by the output voltages of the two Hall sensors.

Specifically, the principle that the Hall sensor 272 and the magnetic element 271 detect the position of the operating lap bar 251 in the first direction F is as follows:

Referring to FIGS. 21 to 24 and FIGS. 27 to 28, the magnet element 271 is driven to rotate when the when the operating lap bar 251 rotates in the first direction F1, and the Hall sensor 272 and the magnetic element 271 generate a relative rotation angle. Since the voltage of the Hall sensor 272 has a linear relationship with the intensity of the magnetic field, the relative positional relationship between the Hall sensor 272 and the magnetic element 271 can be determined according to the output voltages of the two Hall sensors 272. Thus, Thus, the relationship between the output voltage of the Hall sensor 272 and the position of the operating lap bar 251 can be calibrated, so that the position of the corresponding operating lap bar 251 can be determined according to the output voltage of the Hall sensor 272.

Figure 7:
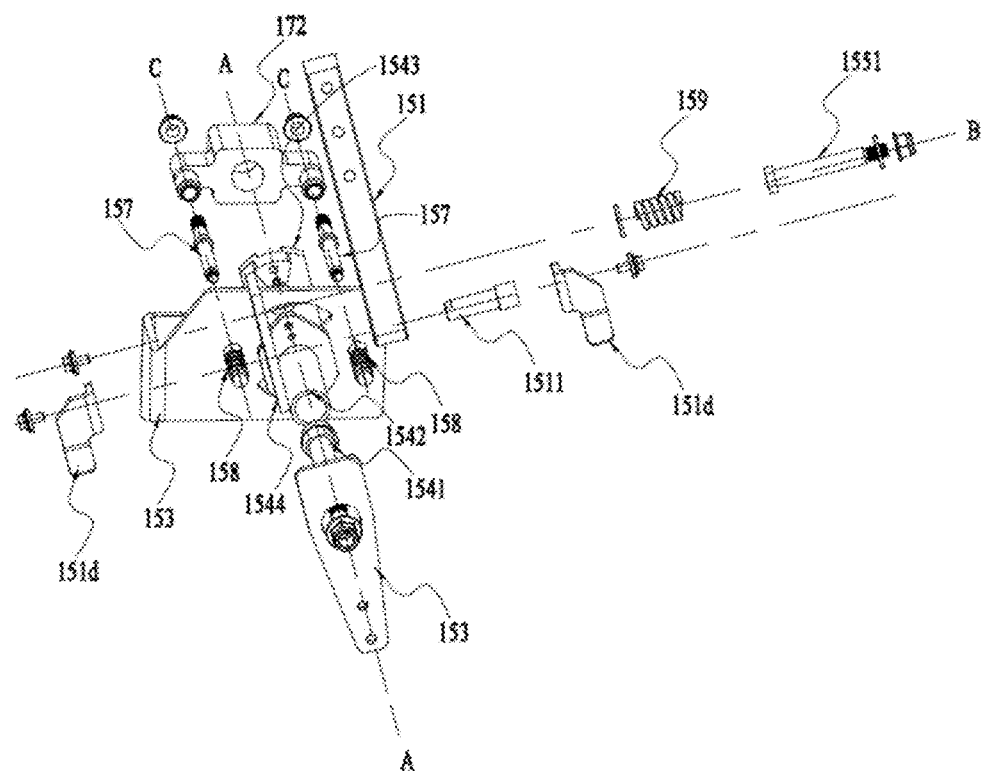
FIG. 7 is an exploded view of the operating apparatus shown in FIG. 5 from another perspective.

For example, assuming that FIG. 7 is the state of the magnetic element 271 when the operating lap bar 251 is at the maximum rear position in the first direction F1, FIG. 8 is the state of the magnetic element 271 when the operating lap bar 251 is at the maximum forward position in the first direction F1. When the operating lap bar 251 rotates from the maximum rear position to the maximum forward position, the output voltage of the two Hall sensors 272 changes with the movement position of the operating lap bar 251. By calibrating the positional relationship between the output voltages of the two Hall sensors 272 and the operating lap bar 251, the current position of the operating lap bar 251 can be determined based on the output voltages of the two Hall sensors 272.

Referring to FIGS. 14 to 20 and FIG. 29, when the operating lap bar 251 rotates in the second direction F2, the magnetic element 271 is driven to rotate toward or away from the magnetic element. For example, when the operating lap bar 251 rotates from the inboard position to the outboard position, the two Hall sensors 272 gradually move away from the magnetic element 271, and the magnetic field intensity felt by the two Hall sensors 272 gradually decreases, so that the output voltages of the two Hall sensors 272 gradually tend to be approximately the same voltage value (for example, 2.5V in FIG. 25), that is, the absolute value of the voltage difference between the two Hall sensors 272 gradually decreases to approximately zero. Therefore, a first preset threshold (for example, 2.5V) can be used to determine whether the operating lap bar 251 is in the inboard position, and a second preset threshold (for example, 0.5V) can be used to determine whether the operating lap bar 251 is in the outboard position.

Specifically, when the absolute value of the voltage difference between the two Hall sensors 272 is greater than the first preset threshold, it is determined that the operating lap bar 251 is in the inboard position, and when the voltage difference between the two Hall sensors 272 is less than the second preset threshold, it is determined that the operation lap bar 251 is in the outboard position.

It should be noted that due to the limitations of the mechanical structure, when the operating lap bar 251 rotates between the forward position, the intermediate position and the rear position in the first direction F1, there may be a small displacement outward in the second direction F2 due to shaking. At this time, At this time, the Hall sensor 272 may not be able to accurately determine whether it is the position in the first direction F1 or the position in the second direction F2. To solve this problem, a preset threshold can be set. If the relationship value of the output voltage or the output voltage of the first Hall sensor 272a and the second Hall sensor 272b or the angle value corresponding to the output voltage or the relationship value of the angle corresponding to the output voltage is within the preset threshold range, the operating lap bar 251 is considered to be at the position in the first direction F1, and if it exceeds the preset threshold, it is considered that the position of the operating lap bar in the second direction F2.

In addition, in this case, the correct position in the first direction F1 of the operating lap bar 251 can be obtained by compensating the output voltage value of the two Hall sensors 272 or the angle value corresponding to the output voltage.

In this example, the sensor is fixedly installed due to the above structure, and the magnetic element is connected in association with the operating lap bar. Using the relative position relationship between the magnetic element and the sensor to detect the position of the operating lap bar 251 in two directions can reduce the inaccurate detection results of the sensor due to movement of the sensor and the damage of the sensor, connection wire and circuit due to frequent movement and pulling of the sensor's connection line, so that the detection result and the system are more reliable, and the structure is simpler. Therefore, this example has a simpler structure, lower cost, and higher reliability than the operating device of the above example.

Figure 30:
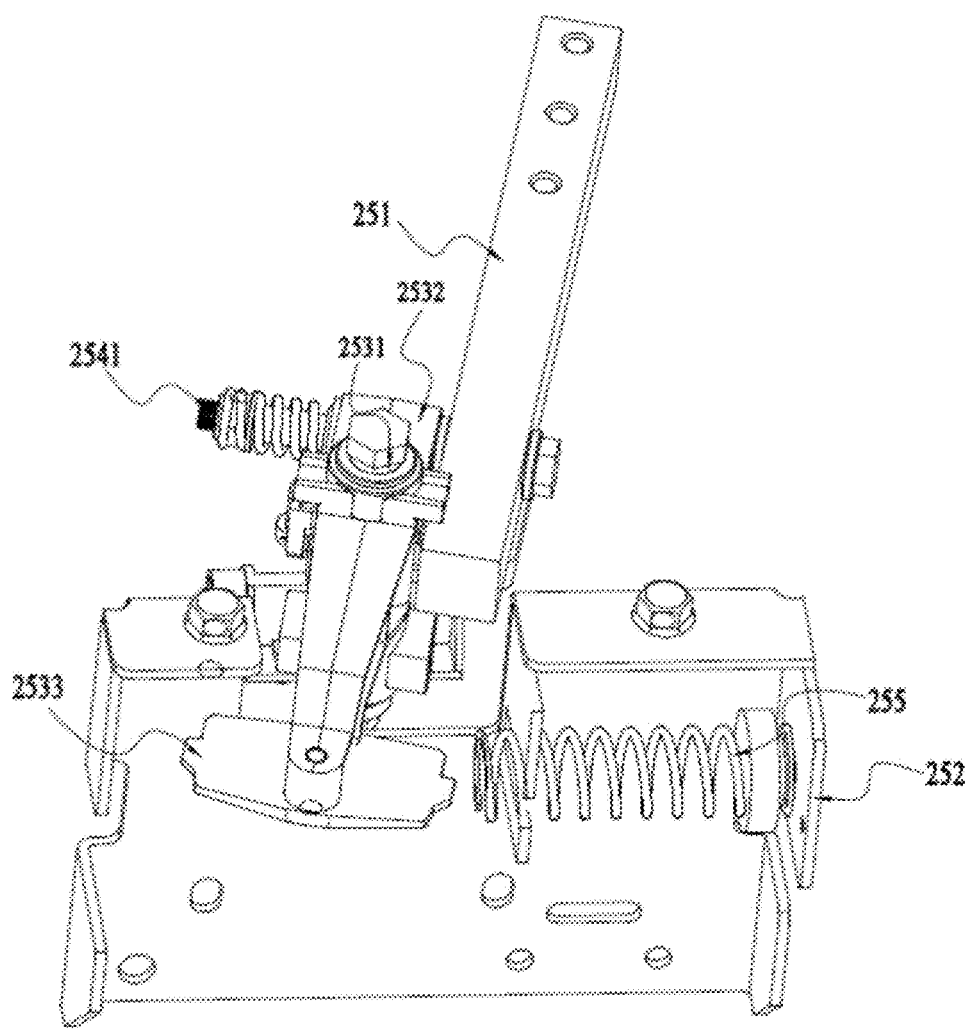
FIG. 30 is a perspective view of the operation apparatus as another example.
Figure 31:
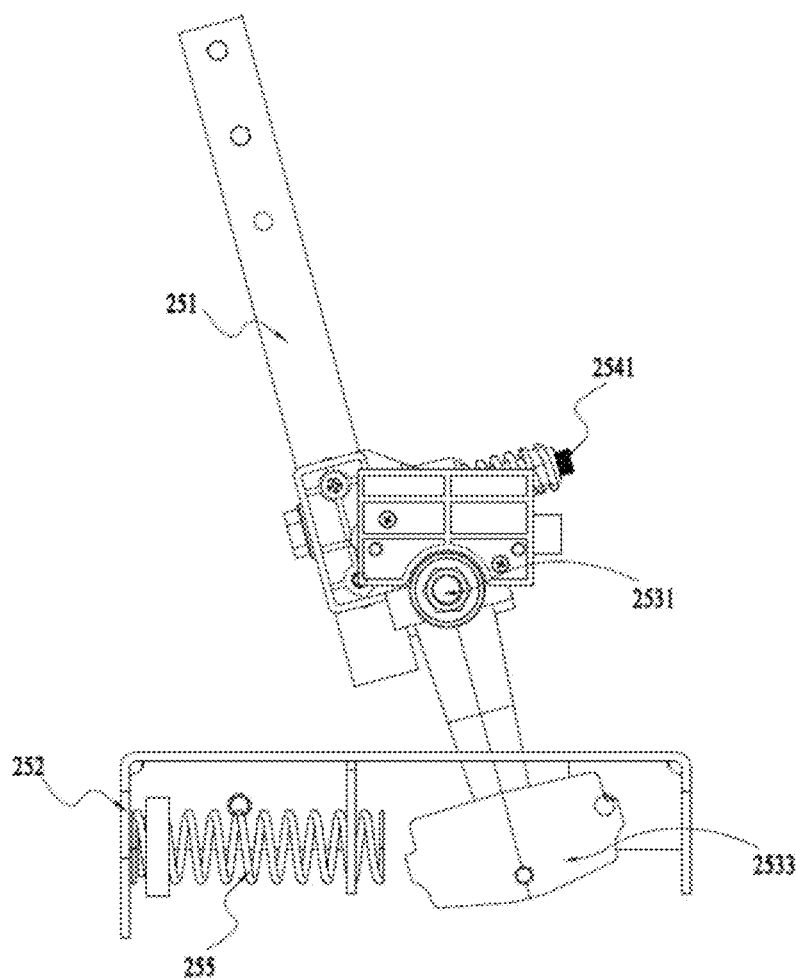
FIG. 31 is a partial structural diagram of the operating apparatus shown in FIG. 30.

Referring to FIGS. 30 and 31, as an option, the operating apparatus 25 further includes an elastic member 255 for allowing the operating lap bar 251 to rebound to the intermediate position when rotating in the first direction F1. Specifically, one end of the elastic member 255 is fixedly connected to the bracket 255, and the other end is configured to be able to contact the extension portion 2533 of the sleeve 2532 of the first pivoting module 253. Therefore, when the operating lap bar 251 rotates from the intermediate position to the rear position, the elastic member 255 is in contact with the operating lap bar 251 to resist the force applied to the operating lap bar from the user, so that after the user withdraws the force, the resilient force of the elastic member 255 causes the operating lap bar 251 to automatically return to the intermediate position.

Figure 32:
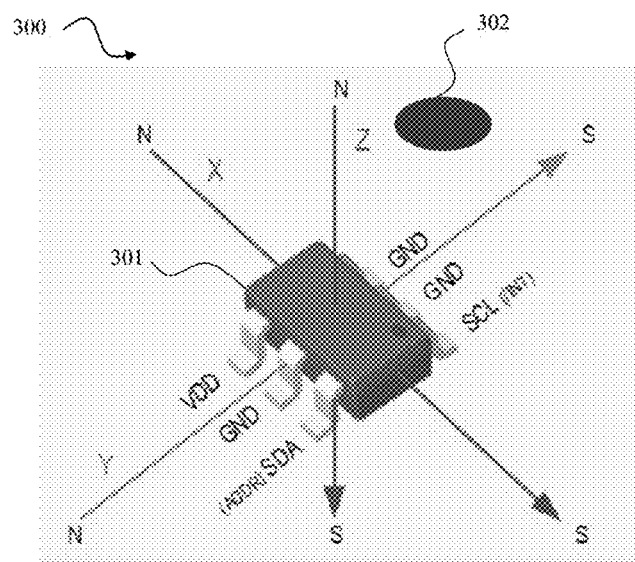
FIG. 32 is a schematic diagram of the position detecting module according to another example.

Referring to FIG. 32, in other examples, the position detecting module 300 of the riding lawnmower can simultaneously detect the position of the operating lap bar in at least two directions, for example, the position in the first direction and the position in the second direction. In particular, the position detecting module 300 can detect positions in three directions. Specifically, the magnetic sensor 301 is a three-dimensional position sensor, which can accurately detect the position of any point in the three-dimensional space of the operating lap bar.

The structure of the operating apparatus may be any of the above-mentioned examples or may be other examples as long as the magnetic element 302 and the magnetic sensor 301 can be spaced apart and can move relative to each other when the operating lap bar moves. The system will thus establish a three-dimensional coordinate system with the magnetic sensor 301 being the sensing center point for the first coordinate axis X, the second coordinate axis Y, and the third coordinate axis Z. Using the magnetic effect, the magnetic sensor 301 can accurately detect any position of the magnetic element 302.

The magnetic element 302 and the magnetic sensor 301 are spaced apart. When the operating lap bar moves, the magnetic element 302 and the magnetic sensor 301 move relative to each other, so that the magnetic sensor 301 can detect the position of the operating lap bar by detecting the relative position of the magnetic element 302 to the magnetic sensor 301.

Referring to FIG. 33, in the present disclosure, The position detecting module 33 of the operating apparatus of the riding lawn mower 100 can simultaneously detect the position of the operating lap bar 34 in at least two directions, for example, the position in the first direction and the position in the second direction.

As a specific example, the position detecting module 33 includes a magnetic sensor 331 and a magnetic element 332, and the magnetic element 332 and the magnetic sensor 331 are spaced apart to be able to generate relative motion.

As a possible example, the magnetic element 332 is connected in association with the pivoting assembly or the operating lap bar 34 of the operating apparatus, and the magnetic sensor 331 is arranged to be relatively fixed to the bracket. When the operating lap bar 34 moves, the magnetic sensor 331 and the magnetic element 332 can produce relative motion.

As a possible example, the magnetic element 332 is arranged to be relatively fixed to the bracket, and the magnetic sensor 331 is provided in association with the operating lap bar 34 or the pivoting assembly; when the operating lap bar 34 moves, the magnetic sensor 331 and the magnetic element 332 can produce relative motion.

As a possible example, the magnetic element 332 is connected in association with the pivoting assembly or the operating lap bar 34, and the magnetic sensor is connected in association with the pivoting assembly or the operating lap bar 34; when the operating lap bar 34 moves, the magnetic sensor and the magnetic element can produce relative motion.

The magnetic element 332 and the magnetic sensor 331 can be configured such that when the operating lap bar 34 rotates in the first direction, the magnetic element 302 and the magnetic sensor 301 can produce relative movement, and the magnetic sensor 301 outputs a detection signal related to the position of the operating lap bar 34 in the first direction.

The magnetic element 332 and the magnetic sensor 331 can be configured such that when the operating lap bar 34 rotates in the second direction, the magnetic element 332 and the magnetic sensor 331 can produce relative movement, and the magnetic sensor 301 outputs a detection signal related to the position of the operating lap bar 34 in the second direction.

The magnetic element 332 and the magnetic sensor 331 can also be configured such that when the operating lap bar 34 rotates in the first direction, the magnetic element 332 and the magnetic sensor 331 can produce relative movement, and the magnetic sensor 301 outputs a detection signal related to the position of the operating lap bar 34 in the first direction; and when the operating lap bar 34 rotates in the second direction, the magnetic element 332 and the magnetic sensor 331 can produce relative movement, and the magnetic sensor 301 outputs a detection signal related to the position of the operating lap bar 34 in the second direction.

As an option, the magnetic sensor 331 is a magnetoresistive sensor. As an option, the magnetic sensor 332 is a Hall sensor.

The magnetic sensor 332 detects the position of the magnetic element relative to the magnetic sensor 332 using the magnetic effect, and outputs an electric signal to the control module 35.

The specific work of the control module 35 is as follows: the operating lap bar position generating unit 351 in the control module 35 obtains the position of the corresponding operating lap bar through table lookup or calculation according to the acquired electrical signal of the magnetic sensor 332; the target rotation speed generating unit 352 in the control module 35 obtains the target rotation speed corresponding to the second motor through calculation or table lookup according to the position of the corresponding operating lap bar; The control quantity generating unit 353 in the control module 35 obtains the control quantity corresponding to the second motor (for example, the input voltage of the corresponding second motor) through calculation or table look-up according to the obtained target speed of the corresponding second motor; The driving signal generating unit 354 in the control module 35 generates a driving signal (for example, a PWM signal) according to the obtained control quantity corresponding to the second motor; Finally, the control module 35 outputs the generated driving signal to the corresponding second motor to control the operation of the corresponding second motor, so that the operating lap bar controls the operation of the corresponding walking wheel.

The above illustrates and describes basic principles, main features and advantages of the present disclosure. Those skilled in the art should appreciate that the above examples do not limit the present disclosure in any form. Technical solutions obtained by equivalent substitution or equivalent variations all fall within the scope of the present disclosure.

As to industrial applicability, the present disclosure provides a riding lawn mower and its operating apparatus. By using a magnetic sensor as a detection device to detect the position of the operating lap bar in two directions. The riding mower and its operating apparatus can be realized with simple structure, low cost and high reliability.

What is claimed is:

1. A riding lawn mower, comprising:
    a chassis;
    a power output assembly comprising a blade for use in a mowing function and a first motor for driving the blade;
    a walking assembly comprising walking wheels and a second motor for driving the walking wheels;
    a power supply device for supplying power to the riding lawn mower;
    a control module for controlling an operating process of the riding lawn mower wherein the second motor is controllable by the control module;
    an operating apparatus configured to be operable to set a target state of the riding lawn mower;
    the operating apparatus comprising:
        at least one bracket mounted on the chassis;
        an operating lap bar assembly comprising an operating lap bar disposed to rotate between a forward position, an intermediate position, and a rear position about a first axis in a first direction and an inboard position and an outboard position about a second axis in a second direction;
        a pivoting assembly for pivotally mounting the operating lap bar on the bracket such that the operating lap bar rotates about the first axis in the first direction and the second axis in the second direction;
        a position detecting module electrically connected to the control module for detecting a position of the operating lap bar; and
        the position detecting module comprising a magnetic element and a magnet sensor, the magnet element spaced apart from the magnet sensor such that the magnet sensor and the magnet element are configured to detect a relative movement of the lap bar assembly and the magnet sensor can output a first detection signal related to the position of the operating lap bar in the first direction to the control module when the operating lap bar is rotated about the first axis in the first direction; and
    the magnet sensor and the magnet element are configured to detect a relative movement of the lap bar assembly and the magnet sensor can output a second detection signal related to the position of the operating lap bar in the second direction to the control module when the operating lap bar is rotated about the second axis in the second direction,
    wherein the control module controls the target state of the riding lawn mower according to the first detection signal and the second detection signal,
    wherein the pivoting assembly comprises a first pivoting module mounted on the bracket for rotating the operating lap bar between the forward position, the intermediate position, and the rear position about the first axis in the first direction, the first pivoting module comprises a first pivot defining a first axis, a second pivoting module is mounted on the bracket for rotating the operating lap bar between the inboard position and the outboard position about the second axis in the second direction, and the second pivoting module comprises a second pivot defining a second axis, and wherein the magnetic element is fixedly coupled to the first pivoting module such that the magnetic element is immovable but rotatable; the magnetic sensor is associated with the second pivoting module such that the magnetic sensor cannot rotate but can move, the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

2. The riding lawn mower of claim 1, wherein the magnet sensor is associated with the operating lap bar to enable movement of the magnet sensor, the magnet element is fixedly coupled to the bracket to disable movement of the magnet element, the operating lap bar drives the magnet sensor to rotate relative to the magnet element, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

3. The riding lawn mower of claim 1, wherein the magnet element is associated with the operating lap bar to enable movement of the magnet element, the magnet sensor is fixedly coupled to the bracket to disable movement of the magnet sensor, the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

4. The riding lawn mower of claim 1, wherein the magnetic sensor is associated with the pivoting assembly, the magnetic element is associated with the pivoting assembly, the magnetic sensor and the magnetic element detects relative motion of the operating lap bar, the operating lap bar drives the magnetic element and the magnetic sensor to rotate relatively, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

5. The riding lawn mower of claim 1, wherein the second detection signal includes a first signal output by the magnetic sensor when the magnetic element is close to the magnetic sensor, the first signal is related to the inboard position of the operating lap bar, a second signal is output by the magnetic sensor when the magnetic element is away from the magnetic sensor, and the second signal is related to the outboard position of the operating lap bar.

6. The riding lawn mower of claim 5, wherein a value or a calculated value of the first signal is greater than a first preset threshold and the value or the calculated value of the second signal is less than a second preset threshold.

7. The riding lawn mower of claim 6, wherein the first preset threshold is greater than or equal to the second preset threshold.

8. The riding lawn mower of claim 1, wherein the magnetic sensor is a magnetoresistive sensor.

9. The riding lawn mower of claim 1, wherein the magnetic sensor is a Hall sensor.

10. The riding lawn mower of claim 9, wherein the magnetic sensor simultaneously detects the position of the operating lap bar in at least two directions.

11. A riding lawn mower, comprising:
a chassis;
a power output assembly comprising a blade for use in a mowing function and a first motor for driving the blade;
a walking assembly comprising walking wheels and a second motor for driving the walking wheels;
a power supply device for supplying power to the riding lawn mower;
a control module for controlling an operating process of the riding lawn mower wherein the second motor is controllable by the control module;
an operating apparatus configured to be operable to set a target state of the riding lawn mower;
the operating apparatus comprising:
at least one bracket mounted on the chassis;
an operating lap bar assembly comprising an operating lap bar disposed to rotate between a forward position, an intermediate position, and a rear position about a first axis in a first direction and an inboard position and an outboard position about a second axis in a second direction;
a pivoting assembly for pivotally mounting the operating lap bar on the bracket such that the operating lap bar rotates about the first axis in the first direction and the second axis in the second direction;
a position detecting module electrically connected to the control module for detecting a position of the operating lap bar; and
the position detecting module comprising a magnetic element and a magnet sensor, the magnet element spaced apart from the magnet sensor such that the magnet sensor and the magnet element are configured to detect a relative movement of the lap bar assembly and the magnet sensor can output a first detection signal related to the position of the operating lap bar in the first direction to the control module when the operating lap bar is rotated about the first axis in the first direction; and
the magnet sensor and the magnet element are configured to detect a relative movement of the lap bar assembly and the magnet sensor can output a second detection signal related to the position of the operating lap bar in the second direction to the control module when the operating lap bar is rotated about the second axis in the second direction,
wherein the control module controls the target state of the riding lawn mower according to the first detection signal and the second detection signal, wherein the pivoting assembly comprises a first pivoting module mounted on the bracket for rotating the operating lap bar between the forward position, the intermediate position, and the rear position about the first axis in the first direction, the first pivoting module comprises a first pivot defining a first axis, a second pivoting module is mounted on the bracket for rotating the operating lap bar between the inboard position and the outboard position about the second axis in the second direction, and the second pivoting module comprises a second pivot defining a second axis, and wherein the magnetic sensor is fixedly coupled to the first pivoting module such that the magnetic sensor is immovable but rotatable, the magnetic element is associated with the second pivoting module such that the magnetic element can move but cannot rotate, the operating lap bar drives the magnet sensor to rotate relative to the magnet element, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

12. The riding lawn mower of claim 11, wherein the magnet sensor is associated with the operating lap bar to enable movement of the magnet sensor, the magnet element is fixedly coupled to the bracket to disable movement of the magnet element, the operating lap bar drives the magnet sensor to rotate relative to the magnet element, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

13. The riding lawn mower of claim 11, wherein the magnet element is associated with the operating lap bar to enable movement of the magnet element, the magnet sensor is fixedly coupled to the bracket to disable movement of the magnet sensor, the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

14. The riding lawn mower of claim 11, wherein the magnetic sensor is associated with the pivoting assembly, the magnetic element is associated with the pivoting assembly, the magnetic sensor and the magnetic element detects relative motion of the operating lap bar, the operating lap bar drives the magnetic element and the magnetic sensor to rotate relatively, in condition that the operating lap bar rotates about the first axis in the first direction, the magnet sensor outputs the first direction signal related to the position in the first direction of the operating lap bar, and, in condition that the operating lap bar rotates about the second axis in the second direction, the magnet sensor outputs the second direction signal related to the position in the second direction of the operating lap bar.

15. The riding lawn mower of claim 11, wherein the second detection signal includes a first signal output by the magnetic sensor when the magnetic element is close to the magnetic sensor, the first signal is related to the inboard position of the operating lap bar, a second signal is output by the magnetic sensor when the magnetic element is away from the magnetic sensor, and the second signal is related to the outboard position of the operating lap bar.

16. The riding lawn mower of claim 15, wherein a value or a calculated value of the first signal is greater than a first preset threshold and the value or the calculated value of the second signal is less than a second preset threshold.

17. The riding lawn mower of claim 16, wherein the first preset threshold is greater than or equal to the second preset threshold.

18. The riding lawn mower of claim 11, wherein the magnetic sensor is a magnetoresistive sensor.

19. The riding lawn mower of claim 11, wherein the magnetic sensor is a Hall sensor.

20. The riding lawn mower of claim 19, wherein the magnetic sensor simultaneously detects the position of the operating lap bar in at least two directions.

21. An operating apparatus for a riding lawn mower, comprising:
at least one bracket mounted on the riding lawn mower;
an operating lap bar assembly comprising an operating lap bar disposed to rotate between a forward position, an intermediate position, and a rear position about a first axis in a first direction and an inboard position and an outboard position about a second axis in a second direction;
a pivoting assembly for pivotally mounting the operating lap bar on the bracket such that the operating lap bar rotates about the first axis in the first direction and the second axis in the second direction,
wherein the operating apparatus further includes a position detecting module for detecting a position of the operating lap bar; the position detecting module comprising a magnetic element and a magnet sensor, the magnet element being spaced apart from the magnet sensor such that the magnet sensor and the magnet element detect a relative movement of the operating lap bar assembly and the magnet sensor can output a first detection signal related to the position of the operating lap bar in the first direction to a control module when the operating lap bar is rotated about the first axis in the first direction and the magnet sensor can output a second detection signal related to the position of the operating lap bar in the second direction to the control module when the operating lap bar is rotated about the second axis in the second direction,
wherein the pivoting assembly comprises a first pivoting module mounted on the bracket for rotating the operating lap bar between the forward position, the intermediate position and the rear position about the first axis in the first direction; the first pivoting module comprises a first pivot defining a first axis, a second pivoting module mounted on the bracket for rotating the operating lap bar between the inboard position and the outboard position about the second axis in the second direction, and the second pivoting module comprises a second pivot defining a second axis, and
wherein the magnetic element is fixedly coupled to the first pivoting module such that the magnetic element is immovable but rotatable, the magnetic sensor is associated with the second pivoting module such that the magnetic sensor cannot rotate but can move, the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

22. The operating apparatus for a riding lawn mower of claim 21, wherein the magnet sensor is associated with the operating lap bar to enable movement of the magnet sensor, the magnet element is fixedly coupled to the bracket to disable movement of the magnet element; the operating lap bar drives the magnet sensor to rotate relative to the magnet element, in condition that the operating lap bar rotates about the first axis in the first direction, the magnet sensor outputs the first direction signal related to the position in the first direction of the operating lap bar, and, in condition that the operating lap bar rotates about the second axis in the second direction the magnet sensor outputs the second direction signal related to the position in the second direction of the operating lap bar.

23. The operating apparatus for a riding lawn mower of claim 21, wherein the magnet element is associated with the operating lap bar to enable movement of the magnet element, the magnet sensor is fixedly coupled to the bracket to disable movement of the magnet sensor; the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

24. The operating apparatus for a riding lawn mower of claim 21, wherein the magnetic sensor is associated with the pivoting assembly, the magnetic element is associated with the pivoting assembly, wherein the magnetic sensor and the magnetic element detect relative motion, the operating lap bar drives the magnetic element and the magnetic sensor to rotate relatively, in condition that the operating lap bar rotates about the first axis in the first direction, the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

25. The operating apparatus for a riding lawn mower of claim 21, wherein the second detection signal includes a first signal output by the magnetic sensor when the magnetic element is close to the magnetic sensor, the first signal is related to the inboard position of the operating lap bar, a second signal is output by the magnetic sensor when the magnetic element is away from the magnetic sensor, and the second signal is related to the outboard position of the operating lap bar.

26. The operating apparatus for a riding lawn mower of claim 25, wherein a value or a calculated value of the first signal is greater than a first preset threshold and the value or the calculated value of the second signal is less than a second preset threshold.

27. The operating apparatus for a riding lawn mower of claim 26, wherein the first preset threshold is greater than or equal to the second preset threshold.

28. An operating apparatus for a riding lawn mower of claim 21, wherein the magnetic sensor is a magnetoresistive sensor.

29. The operating apparatus for a riding lawn mower of claim 21, wherein the magnetic sensor is a Hall sensor.

30. The operating apparatus for a riding lawn mower of claim 21, wherein the magnetic sensor simultaneously detects the position of the operating lap bar in at least two directions.

31. The operating apparatus for a riding lawn mower of claim 21, wherein the magnetic sensor simultaneously detects the position of the operating lap bar in at least two directions.

32. An operating apparatus for a riding lawn mower, comprising:
at least one bracket mounted on the riding lawn mower;
an operating lap bar assembly comprising an operating lap bar disposed to rotate between a forward position, an intermediate position, and a rear position about a first axis in a first direction and an inboard position and an outboard position about a second axis in a second direction;
a pivoting assembly for pivotally mounting the operating lap bar on the bracket such that the operating lap bar rotates about the first axis in the first direction and the second axis in the second direction,
wherein the operating apparatus further includes a position detecting module for detecting a position of the operating lap bar; the position detecting module comprising a magnetic element and a magnet sensor, the magnet element being spaced apart from the magnet sensor such that the magnet sensor and the magnet element detect a relative movement of the operating lap bar assembly and the magnet sensor can output a first detection signal related to the position of the operating lap bar in the first direction to a control module when the operating lap bar is rotated about the first axis in the first direction and the magnet sensor can output a second detection signal related to the position of the operating lap bar in the second direction to the control module when the operating lap bar is rotated about the second axis in the second direction,
wherein the pivoting assembly comprises a first pivoting module mounted on the bracket for rotating the operating lap bar between the forward position, the intermediate position and the rear position about the first axis in the first direction; the first pivoting module comprises a first pivot defining a first axis, a second pivoting module mounted on the bracket for rotating the operating lap bar between the inboard position and the outboard position about the second axis in the second direction, and the second pivoting module comprises a second pivot defining a second axis, and
wherein the magnetic sensor is fixedly coupled to the first pivoting module such that the magnetic sensor is immovable but rotatable, the magnetic element is associated with the second pivoting module such that the magnetic element can move but cannot rotate, the operating lap bar drives the magnet sensor to rotate relative to the magnet element, in condition that the operating lap bar rotates about the first axis in the first direction, and the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

33. The operating apparatus for a riding lawn mower of claim 32, wherein the magnet sensor is associated with the operating lap bar to enable movement of the magnet sensor, the magnet element is fixedly coupled to the bracket to disable movement of the magnet element; the operating lap bar drives the magnet sensor to rotate relative to the magnet element, in condition that the operating lap bar rotates about the first axis in the first direction, the magnet sensor outputs the first direction signal related to the position in the first direction of the operating lap bar, and, in condition that the operating lap bar rotates about the second axis in the second direction the magnet sensor outputs the second direction signal related to the position in the second direction of the operating lap bar.

34. The operating apparatus for a riding lawn mower of claim 32, wherein the magnet element is associated with the operating lap bar to enable movement of the magnet element, the magnet sensor is fixedly coupled to the bracket to disable movement of the magnet sensor; the operating lap bar drives the magnet element to rotate relative to the magnet sensor, in condition that the operating lap bar rotates about the first axis in the first direction, the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

35. The operating apparatus for a riding lawn mower of claim 32, wherein the magnetic sensor is associated with the pivoting assembly, the magnetic element is associated with the pivoting assembly, wherein the magnetic sensor and the magnetic element detect relative motion, the operating lap bar drives the magnetic element and the magnetic sensor to rotate relatively, in condition that the operating lap bar rotates about the first axis in the first direction, the magnet sensor outputs the first direction signal related to the position in the first direction of the operating lap bar, and, in condition that the operating lap bar rotates about the second axis in the second direction, and the magnet sensor outputs the second direction signal related to the position in the second direction of the operating lap bar.

36. The operating apparatus for a riding lawn mower of claim 32, wherein the second detection signal includes a first signal output by the magnetic sensor when the magnetic element is close to the magnetic sensor, the first signal is related to the inboard position of the operating lap bar, a second signal is output by the magnetic sensor when the magnetic element is away from the magnetic sensor, and the second signal is related to the outboard position of the operating lap bar.

37. The operating apparatus for a riding lawn mower of claim 36, wherein a value or a calculated value of the first signal is greater than a first preset threshold and the value or the calculated value of the second signal is less than a second preset threshold.

38. The operating apparatus for a riding lawn mower of claim 37, wherein the first preset threshold is greater than or equal to the second preset threshold.

39. An operating apparatus for a riding lawn mower of claim 32, wherein the magnetic sensor is a magnetoresistive sensor.

40. The operating apparatus for a riding lawn mower of claim 32, wherein the magnetic sensor is a Hall sensor.

41. The operating apparatus for a riding lawn mower of claim 32, wherein the magnetic sensor simultaneously detects the position of the operating lap bar in at least two directions.

42. The operating apparatus for a riding lawn mower of claim 32, wherein the magnetic sensor simultaneously detects the position of the operating lap bar in at least two directions.

* * * * *